(12) United States Patent
Sandrew et al.

(10) Patent No.: US 9,282,321 B2
(45) Date of Patent: Mar. 8, 2016

(54) 3D MODEL MULTI-REVIEWER SYSTEM

(71) Applicant: LEGEND3D, Inc., Carlsbad, CA (US)

(72) Inventors: Jared Sandrew, San Diego, CA (US);
Tony Baldridge, San Diego, CA (US);
Anthony Lopez, San Diego, CA (US);
Jacqueline McFarland, San Diego, CA (US); Scott Jones, San Diego, CA (US);
Thomas Schad, San Diego, CA (US)

(73) Assignee: LEGEND3D, INC., Carlsbad, CA (US)

( * ) Notice: Subject to any disclaimer, the term of this patent is extended or adjusted under 35 U.S.C. 154(b) by 0 days.

(21) Appl. No.: 14/827,482

(22) Filed: Aug. 17, 2015

(65) Prior Publication Data

US 2015/0358613 A1 Dec. 10, 2015

Related U.S. Application Data

(63) Continuation-in-part of application No. 14/709,327, filed on May 11, 2015, which is a continuation-in-part of application No. 13/874,625, filed on May 1, 2013, application No. 14/827,482, which is a
(Continued)

(51) Int. Cl.
*G06K 9/00* (2006.01)
*H04N 13/02* (2006.01)
*H04N 5/232* (2006.01)

(52) U.S. Cl.
CPC ....... *H04N 13/0271* (2013.01); *H04N 5/23238* (2013.01); *H04N 13/026* (2013.01); *H04N 13/0242* (2013.01); *H04N 13/0257* (2013.01); *H04N 13/0296* (2013.01)

(58) Field of Classification Search
None
See application file for complete search history.

(56) References Cited

U.S. PATENT DOCUMENTS 2,593,925 A 4/1952 Sheldon
2,799,722 A 7/1957 Neugebauer
(Continued)

FOREIGN PATENT DOCUMENTS

DE 003444353 6/1986
DE 003444353 12/1986
(Continued)

OTHER PUBLICATIONS

Tam et al., "3D-TV Content Generation: 2D-to-3D Conversion", ICME 2006, p. 1868-1872.
(Continued)

*Primary Examiner* — Jayesh A Patel
(74) *Attorney, Agent, or Firm* — ARC IP Law, PC; Joseph J. Mayo

(57) ABSTRACT

A system that coordinates multiple simultaneous reviews of a 3D model, potentially from different viewpoints. Embodiments support multiple reviewers using review stations that render images of the model based on the pose of the reviewer. For example, multiple reviewers may use virtual reality headsets to observe a 3D virtual environment from different orientations. A coordinator uses a coordinator station to observe the entire 3D model and the viewpoints of each of the reviewers in this 3D model. Embodiments may support reviewer designation of regions within the model that require review or modification; these designated regions are also displayed on the coordinator station. Embodiments may support real time updates to the 3D model and propagation of updated images to the coordinator and to the multiple viewers.

19 Claims, 32 Drawing Sheets
(18 of 32 Drawing Sheet(s) Filed in Color)

Related U.S. Application Data continuation-in-part of application No. 13/895,979, filed on May 16, 2013, now Pat. No. 9,113,130, which is a continuation-in-part of application No. 13/366,899, filed on Feb. 6, 2012, now Pat. No. 9,031,383, which is a continuation-in-part of application No. 13/029,862, filed on Feb. 17, 2011, now Pat. No. 8,385,684.

(56) References Cited

U.S. PATENT DOCUMENTS

| | | |
|---|---|---|
| 2,804,500 A | 8/1957 | Giacoletto |
| 2,874,212 A | 2/1959 | Bechley |
| 2,883,763 A | 4/1959 | Schaper |
| 2,974,190 A | 3/1961 | Geiger |
| 3,005,042 A | 10/1961 | Horsley |
| 3,258,528 A | 6/1966 | Oppenheimer |
| 3,486,242 A | 12/1969 | Aronson |
| 3,551,589 A | 12/1970 | Moskovitz |
| 3,558,811 A | 1/1971 | Barton et al. |
| 3,560,644 A | 2/1971 | Palmer et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et al. |
| 3,619,051 A | 11/1971 | Wright |
| 3,621,127 A | 11/1971 | Hope |
| 3,647,942 A | 3/1972 | Siegel et al. |
| 3,673,317 A | 6/1972 | Kennedy et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reiffel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Dalke et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingermann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka et al. |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,055,939 A | 10/1991 | Karamon et al. |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,243,460 A | 9/1993 | Kornberg |
| 5,252,953 A | 10/1993 | Sandrew et al. |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,363,476 A | 11/1994 | Kurashige et al. |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,668,605 A | 9/1997 | Nachshon et al. |
| 5,673,081 A | 9/1997 | Yamashita et al. |
| 5,682,437 A | 10/1997 | Okino et al. |
| 5,684,715 A | 11/1997 | Palmer |
| 5,699,443 A | 12/1997 | Murata et al. |
| 5,699,444 A | 12/1997 | Palm |
| 5,717,454 A | 2/1998 | Adolphi et al. |
| 5,729,471 A | 3/1998 | Jain et al. |
| 5,734,915 A | 3/1998 | Roewer |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,777,666 A | 7/1998 | Tanase et al. |
| 5,778,108 A | 7/1998 | Coleman |
| 5,784,175 A | 7/1998 | Lee |
| 5,784,176 A | 7/1998 | Narita |
| 5,808,664 A | 9/1998 | Yamashita et al. |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |

(56) References Cited

U.S. PATENT DOCUMENTS

| | | |
|---|---|---|
| 5,990,900 A | 11/1999 | Seago |
| 5,990,903 A | 11/1999 | Donovan |
| 5,999,660 A | 12/1999 | Zorin et al. |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |
| 6,119,123 A | 9/2000 | Dimitrova et al. |
| 6,132,376 A | 10/2000 | Hossack et al. |
| 6,141,433 A | 10/2000 | Moed et al. |
| 6,157,747 A | 12/2000 | Szeliski |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |
| 6,226,015 B1 | 5/2001 | Danneels et al. |
| 6,228,030 B1 | 5/2001 | Urbano et al. |
| 6,263,101 B1 | 7/2001 | Klein et al. |
| 6,271,859 B1 | 8/2001 | Asente |
| 6,314,211 B1 | 11/2001 | Kim et al. |
| 6,329,963 B1 | 12/2001 | Chiabrera |
| 6,337,709 B1 | 1/2002 | Yamaashi et al. |
| 6,360,027 B1 | 3/2002 | Hossack et al. |
| 6,363,170 B1 * | 3/2002 | Seitz ............... G06T 17/00 345/424 |
| 6,364,835 B1 | 4/2002 | Hossack et al. |
| 6,373,970 B1 | 4/2002 | Dong et al. |
| 6,390,980 B1 | 5/2002 | Peterson et al. |
| 6,405,366 B1 | 6/2002 | Lorenz et al. |
| 6,414,678 B1 | 7/2002 | Goddard et al. |
| 6,416,477 B1 | 7/2002 | Jago |
| 6,426,750 B1 * | 7/2002 | Hoppe ............... G06T 17/20 345/423 |
| 6,429,867 B1 | 8/2002 | Deering |
| 6,445,816 B1 | 9/2002 | Pettigrew |
| 6,456,340 B1 | 9/2002 | Margulis |
| 6,466,205 B2 | 10/2002 | Simpson et al. |
| 6,474,970 B1 | 11/2002 | Caldoro |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,553,184 B1 | 4/2003 | Ando et al. |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amuah |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Aman et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,850,252 B1 | 2/2005 | Hoffberg |
| 6,853,383 B2 | 2/2005 | Duquesnois |
| 6,859,523 B1 | 2/2005 | Jilk et al. |
| 6,919,892 B1 | 7/2005 | Cheiky et al. |
| 6,964,009 B2 | 11/2005 | Samaniego et al. |
| 6,965,379 B2 | 11/2005 | Lee et al. |
| 6,973,434 B2 | 12/2005 | Miller |
| 6,985,187 B2 | 1/2006 | Han et al. |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Connor et al. |
| 7,098,910 B2 | 8/2006 | Petrovic et al. |
| 7,102,633 B2 | 9/2006 | Kaye et al. |
| 7,110,605 B2 | 9/2006 | Marcellini et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,136,075 B1 | 11/2006 | Hamburg |
| 7,181,081 B2 | 2/2007 | Sandrew |
| 7,190,496 B2 | 3/2007 | Klug et al. |
| 7,254,264 B2 | 8/2007 | Naske et al. |
| 7,254,265 B2 | 8/2007 | Naske et al. |
| 7,260,274 B2 | 8/2007 | Sawhney et al. |
| 7,272,265 B2 | 9/2007 | Kouri et al. |
| 7,298,094 B2 | 11/2007 | Yui |
| 7,308,139 B2 | 12/2007 | Wentland et al. |
| 7,321,374 B2 | 1/2008 | Naske |
| 7,327,360 B2 | 2/2008 | Petrovic et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,538,768 B2 | 5/2009 | Kiyokawa et al. |
| 7,542,034 B2 | 6/2009 | Spooner et al. |
| 7,558,420 B2 | 7/2009 | Era |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,663,689 B2 | 2/2010 | Marks |
| 7,665,798 B2 | 2/2010 | McNally et al. |
| 7,680,653 B2 | 3/2010 | Yeldener |
| 7,772,532 B2 | 8/2010 | Olsen et al. |
| 7,852,461 B2 | 12/2010 | Yahav |
| 7,860,342 B2 | 12/2010 | Levien et al. |
| 7,894,633 B1 | 2/2011 | Harman |
| 7,940,961 B2 | 5/2011 | Allen |
| 8,036,451 B2 | 10/2011 | Redert et al. |
| 8,085,339 B2 | 12/2011 | Marks |
| 8,090,402 B1 | 1/2012 | Fujisaki |
| 8,194,102 B2 | 6/2012 | Cohen |
| 8,213,711 B2 | 7/2012 | Tam et al. |
| 8,217,931 B2 | 7/2012 | Lowe et al. |
| 8,244,104 B2 | 8/2012 | Kashiwa |
| 8,320,634 B2 | 11/2012 | Deutsch |
| 8,384,763 B2 | 2/2013 | Tam et al. |
| 8,401,336 B2 | 3/2013 | Baldridge et al. |
| 8,462,988 B2 | 6/2013 | Boon |
| 8,488,868 B2 | 7/2013 | Tam et al. |
| 8,526,704 B2 | 9/2013 | Dobbe |
| 8,543,573 B2 | 9/2013 | MacPherson |
| 8,634,072 B2 | 1/2014 | Trainer |
| 8,670,651 B2 | 3/2014 | Sakuragi et al. |
| 8,698,798 B2 | 4/2014 | Murray et al. |
| 8,907,968 B2 | 12/2014 | Tanaka et al. |
| 8,922,628 B2 | 12/2014 | Bond |

(56) References Cited

U.S. PATENT DOCUMENTS

| | | |
|---|---|---|
| 2001/0025267 A1 | 9/2001 | Janiszewski |
| 2001/0051913 A1 | 12/2001 | Vashistha et al. |
| 2002/0001045 A1 | 1/2002 | Ranganath et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice |
| 2003/0046656 A1 | 3/2003 | Saxena |
| 2003/0069777 A1 | 4/2003 | Or-Bach |
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |
| 2004/0062439 A1 | 4/2004 | Cahill et al. |
| 2004/0130680 A1 | 7/2004 | Zhou et al. |
| 2004/0151471 A1 | 8/2004 | Ogikubo |
| 2004/0181444 A1 | 9/2004 | Sandrew |
| 2004/0189796 A1 | 9/2004 | Ho et al. |
| 2004/0258089 A1 | 12/2004 | Derechin et al. |
| 2005/0083421 A1 | 4/2005 | Berezin et al. |
| 2005/0088515 A1 | 4/2005 | Geng |
| 2005/0104878 A1 | 5/2005 | Kaye et al. |
| 2005/0146521 A1 | 7/2005 | Kaye et al. |
| 2005/0188297 A1 | 8/2005 | Knight et al. |
| 2005/0207623 A1 | 9/2005 | Liu et al. |
| 2005/0231501 A1 | 10/2005 | Nitawaki |
| 2005/0231505 A1 | 10/2005 | Kaye et al. |
| 2005/0280643 A1 | 12/2005 | Chen |
| 2006/0028543 A1 | 2/2006 | Sohn et al. |
| 2006/0061583 A1 | 3/2006 | Spooner et al. |
| 2006/0083421 A1 | 4/2006 | Weiguo et al. |
| 2006/0143059 A1 | 6/2006 | Sandrew |
| 2006/0159345 A1 | 7/2006 | Clary et al. |
| 2006/0274905 A1 | 12/2006 | Lindahl et al. |
| 2007/0052807 A1 | 3/2007 | Zhou et al. |
| 2007/0236514 A1* | 10/2007 | Agusanto ............ A61B 1/00193 345/646 |
| 2007/0238981 A1* | 10/2007 | Zhu ........................ A61B 19/52 600/424 |
| 2007/0260634 A1 | 11/2007 | Makela et al. |
| 2007/0279412 A1 | 12/2007 | Davidson et al. |
| 2007/0279415 A1 | 12/2007 | Sullivan et al. |
| 2007/0286486 A1 | 12/2007 | Goldstein |
| 2007/0296721 A1 | 12/2007 | Chang et al. |
| 2008/0002878 A1 | 1/2008 | Meiyappan |
| 2008/0044155 A1 | 2/2008 | Kuspa |
| 2008/0079851 A1 | 4/2008 | Stanger et al. |
| 2008/0117233 A1 | 5/2008 | Mather et al. |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |
| 2008/0225045 A1 | 9/2008 | Birtwistle |
| 2008/0225059 A1 | 9/2008 | Lowe et al. |
| 2008/0226123 A1 | 9/2008 | Birtwistle |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0219383 A1 | 9/2009 | Passmore |
| 2009/0256903 A1 | 10/2009 | Spooner et al. |
| 2009/0290758 A1 | 11/2009 | Ng-Thow-Hing et al. |
| 2009/0303204 A1 | 12/2009 | Nasiri |
| 2010/0045666 A1 | 2/2010 | Kommann |
| 2010/0166338 A1 | 7/2010 | Lee |
| 2010/0259610 A1 | 10/2010 | Petersen |
| 2011/0050864 A1 | 3/2011 | Bond |
| 2011/0074784 A1 | 3/2011 | Turner et al. |
| 2011/0164109 A1 | 7/2011 | Balderinge et al. |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0039525 A1 | 2/2012 | Tian et al. |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0274626 A1 | 11/2012 | Hsieh |
| 2012/0281906 A1 | 11/2012 | Appia |
| 2012/0306849 A1 | 12/2012 | Steen |
| 2013/0051659 A1 | 2/2013 | Yamamoto |
| 2013/0234934 A1* | 9/2013 | Champion .............. G06F 3/012 345/156 |
| 2014/0130680 A1 | 5/2014 | Fin et al. |
| 2014/0169767 A1 | 6/2014 | Goldberg |

FOREIGN PATENT DOCUMENTS

| | | |
|---|---|---|
| EP | 0302454 | 2/1989 |
| EP | 1187494 | 4/2004 |
| EP | 1719079 | 11/2006 |
| GB | 2487039 A | 11/2012 |
| JP | 60-52190 | 3/1985 |
| JP | 2002123842 | 4/2002 |
| JP | 2003046982 | 2/2003 |
| JP | 2004-207985 | 7/2004 |
| JP | 2004207985 | 7/2004 |
| KR | 20120095059 | 8/2012 |
| KR | 20130061289 | 11/2013 |
| RU | 2376632 | 12/1998 |
| SU | 1192168 A | 9/1982 |
| SU | 1192168 A | 11/1982 |
| WO | 9724000 | 7/1997 |
| WO | 9912127 | 3/1999 |
| WO | 9930280 | 6/1999 |
| WO | 0079781 | 12/2000 |
| WO | 0101348 | 1/2001 |
| WO | 0213143 | 2/2002 |
| WO | 2006078237 | 7/2006 |
| WO | 20070148219 | 12/2007 |
| WO | 2008075276 | 6/2008 |
| WO | 2011029209 | 9/2011 |
| WO | 2012016600 | 2/2012 |
| WO | 2013084234 | 6/2013 |

OTHER PUBLICATIONS

Harman et al. "Rapid 2D to 3D Conversion", The Reporter, vol. 17, No. 1, Feb. 2002, 12 pages.

Legend Films, "System and Method for Conversion of Sequences of Two-Dimensional Medical Images to Three-Dimensional Images" Sep. 12, 2013, 7 pages.

International Search Report Issued for PCT/US2013/072208, dated Feb. 27, 2014, 6 pages.

International Search Report and Written Opinion issued for PCT/US2013/072447, dated Mar. 13, 2014, 6 pages.

International Preliminary Report on Patentability received in PCT/US2013/072208 on Jun. 11, 2015, 5 pages.

International Preliminary Report on Patentability received in PCT/US2013/072447 on Jun. 11, 2015, 12 pages.

McKenna "Interactive Viewpoint Control and Three-Dimensional Operations", Computer Graphics and Animation Group, The Media Laboratory, pp. 53-56, 1992.

European Search Report Received in PCTUS2011067024 on Nov. 28, 2014, 6 pages.

"Nintendo DSi Uses Camera Face Tracking to Create 3D Mirages", retrieved from www.Gizmodo.com on Mar. 18, 2013, 3 pages.

Noll, Computer-Generated Three-Dimensional Movies, Computers and Automation, vol. 14, No. 11 (Nov. 1965), pp. 20-23.

(56) References Cited

OTHER PUBLICATIONS

Noll, Stereographic Projections by Digital Computer, Computers and Automation, vol. 14, No. 5 (May 1965), pp. 32-34.
Australian Office Action issued for 2002305387, dated Mar. 15, 2007, 2 page.
Canadian Office Action, Dec. 28, 2011, Appl No. 2,446,150, 4 pages.
Canadian Office Action, Oct. 8, 2010, App. No. 2,446,150, 6 pages.
Canadian Office Action, Jun. 13, 2011, App. No. 2,446,150, 4 pages.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).
Declaration of Barbara Frederiksen in Support of In-Three, Inc's Opposition to Plaintiff's Motion for Preliminary Injunction, Aug. 1, 2005, *IMAX Corporation et al v. In-Three, Inc.*, Case No. CV05 1795 FMC (Mcx). (25 pages).
Declaration of John Marchioro, Exhibit C, 3 pages, Nov. 2, 2007.
Declaration of Michael F. Chou, Exhibit B, 12 pages, Nov. 2, 2007.
Declaration of Steven K. Feiner, Exhibit A, 10 pages, Nov. 2, 2007.
Di Zhong, Shih-Fu Chang, "AMOS: An Active System for MPEG-4 Video Object Segmentation," ICIP (2) 8: 647-651, Apr. 1998.
E. N. Mortensen and W. A. Barrett, "Intelligent Scissors for Image Composition," Computer Graphics (SIGGRAPH '95), pp. 191-198, Los Angeles, CA, Aug. 1995.
EPO Office Action issued for EP Appl. No. 02734203.9, dated Sep. 12, 2006, 4 pages.
EPO Office Action issued for EP Appl. No. 02734203.9, dated Oct. 7, 2010, 5 pages.
Eric N. Mortensen, William A. Barrett, "Interactive segmentation with Intelligent Scissors," Graphical Models and Image Processing, v.60 No. 5, p. 349-384, Sep. 2002.
Exhibit 1 to Declaration of John Marchioro, Revised translation of portions of Japanese Patent Document No. 60-52190 to Hiromae, 3 pages, Nov. 2, 2007.
Gao et al., Perceptual Motion Tracking from Image Sequences, IEEE, Jan. 2001, pp. 389-392.
Grossman, "Look Ma, No Glasses", Games, Apr. 1992, pp. 12-14.
Hanrahan et al., "Direct WYSIWYG painting and texturing on 3D shapes", Computer Graphics, vol. 24, Issue 4, pp. 215-223. Aug. 1990.
Zhong, et al., "Interactive Tracker—A Semi-automatic Video Object Tracking and Segmentation System," Microsoft Research China, http://research.microsoft.com (Aug. 26, 2003).
Indian Office Action issued for Appl. No. 49/DELNP/2005, dated Apr. 4, 2007, 9 pages.
Interpolation (from Wikipedia encyclopedia, article pp. 1-6) retrieved from Internet URL: http://en.wikipedia.org/wiki/Interpolation on Jun. 5, 2008.
IPER, Mar. 29, 2007, PCT/US2005/014348, 5 pages.
IPER, Oct. 5, 2012, PCT/US2011/058182, 6 pages.
International Search Report, Jun. 13, 2003, PCT/US02/14192, 4 pages.
PCT Search Report issued for PCT/US2011/058182, dated May 10, 2012, 8 pages.
PCT Search Report issued for PCT/US2011/067024, dated Aug. 22, 2012, 10 pages.
Izquierdo et al., Virtual 3D-View Generation from Stereoscopic Video Data, IEEE, Jan. 1998, pp. 1219-1224.
Jul. 21, 2005, Partial Testimony, Expert: Samuel Zhou, Ph.D., 2005 WL 3940225 (C.D.Cal.), 21 pages.
Kaufman, D., "The Big Picture", Apr. 1998, http://www.xenotech.com Apr. 1998, pp. 1-4.
Lenny Lipton, "Foundations of the Stereo-Scopic Cinema, a Study in Depth" With and Appendix on 3D Television, 325 pages, May 1978.
Lenny Lipton, Foundations of the Stereo-Scopic Cinema a Study in Depth, 1982, Van Nostrand Reinhold Company.
Machine translation of JP Patent No. 2004-207985, dated Jul. 22, 2008, 34 pg.
Michael Gleicher, "Image Snapping," SIGGRAPH: 183-190, Jun. 1995.
Murray et al., Active Tracking, IEEE International Conference on Intelligent Robots and Systems, Sep. 1993, pp. 1021-1028.
Ohm et al., An Object-Based System for Stereopscopic Viewpoint Synthesis, IEEE transaction on Circuits and Systems for Video Technology, vol. 7, No. 5, Oct. 1997, pp. 801-811.
Optical Reader (from Wikipedia encyclopedia, article p. 1) retrieved from Internet URL:http://en.wikipedia.org/wiki/Optical_reader on Jun. 5, 2008.
Selsis et al., Automatic Tracking and 3D Localization of Moving Objects by Active Contour Models, Intelligent Vehicles 95 Symposium, Sep. 1995, pp. 96-100.
Slinker et al., "The Generation and Animation of Random Dot and Random Line Autostereograms", Journal of Imaging Science and Technology, vol. 36, No. 3, pp. 260-267, May 1992.
Nguyen et al., Tracking Nonparameterized Object Contours in Video, IEEE Transactions on Image Processing, vol. 11, No. 9, Sep. 2002, pp. 1081-1091.
U.S. District Court, C.D. California, *IMAX Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, WL 3940223 (C.D.Cal.), 6 pages.
U.S. District Court, C.D. California, *IMAX v. In-Three*, No. 05 CV 1795, 2005, Partial Testimony, Expert: David Geshwind, WestLaw 2005, WL 3940224 (C.D.Cal.), 8 pages.
U.S. District Court, C.D. California, Western Division, *IMAX Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.
U.S. Patent and Trademark Office, Before the Board of Patent Appeals and Interferences, Ex Parte Three-Dimensional Media Group, Ltd., Appeal 2009-004087, Reexamination Control No. 90/007,578, U.S. Pat. No. 4,925,294, Decis200, 88 pages, Jul. 30, 2010.
Yasushi Mae, et al., "Object Tracking in Cluttered Background Based on Optical Flow and Edges," Proc. 13th Int. Conf. on Pattern Recognition, vol. 1, pp. 196-200, Apr. 1996.
PCT ISR, Feb. 27, 2007, PCT/US2005/014348, 8 pages.
PCT ISR, Sep. 11, 2007, PCT/US07/62515, 9 pages.
PCT ISR, Nov. 14, 2007, PCT/US07/62515, 24 pages.
PCT IPRP, Jul. 4, 2013, PCT/US2011/067024, 5 pages.
Weber, et al., "Rigid Body Segmentation and Shape Description from Dense Optical Flow Under Weak Perspective," IEEE Transactions on Pattern Analysis and Machine Intelligence, vol. 19, No. 2, Feb. 1997, pp. 139-143.
IPER, May 10, 2013, PCT/US2011/058182, 6 pages.
European Office Action dated Jun. 26, 2013, received for EP Appl. No. 02734203.9 on Jul. 22, 2013, 5 pages.
PCT Search Report and Written Opinion, dated Aug. 22, 2013, for PCT Appl. No. PCT/US2013/035506, 7 pages.
Interpolation (from Wikipedia encyclopedia, article pp. 1-6), retrieved from Internet URL:http://en.wikipedia.org/wiki/Interpolation on Jun. 5, 2008.
Optical Reader (from Wikipedia encyclopedia, article p. 1), retrieved from Internet URL:http://en.wikipedia.org/wiki/Optical_reader on Jun. 5, 2008.
U.S. Patent and Trademark Office, Before the Board of Patent Appeals and Interferences, Ex Parte Three-Dimensional Media Group, Ltd., Appeal 2009-004087, Reexamination Control No. 90/007,578, U.S. Pat. No. 4,925,294, Decision on Appeal, 88 pages, Jul. 30, 2010.
International Search Report dated May 10, 2012, 8 pages.
Machine translation of JP Patent No. 2004-207985, dated Jul. 22, 2008, 34 pages.
Nell et al., "Stereographic Projections by Digital Computer", Computers and Automation for May 1965, pp. 32-34.

(56) References Cited

OTHER PUBLICATIONS

Nell, "Computer-Generated Three-Dimensional Movies" Computers and Automation for Nov. 1965, pp. 20-23.

International Search Report received fro PCT Application No. PCT/US2011/067024, dated Aug. 22, 2012, 10 pages.

International Patentability Preliminary Report and Written Opinion / PCT/US2013/035506, dated Aug. 21, 2014, 6 pages.

Zhang, et al., "Stereoscopic Image Generation Based on Depth Images for 3D TV", IEEE Transactions on Broadcasting, vol. 51, No. 2, pp. 191-199, Jun. 2005.

Beraldi, et al., "Motion and Depth from Optical Flow", Lab. Di Bioingegneria, Facolta' di Medicina, Universit' di Modena, Modena, Italy; pp. 205-208, 1989.

Hendriks, et al. "Converting 2D to 3D: A Survey", Information and Communication Theory Group, Dec. 2005.

* cited by examiner

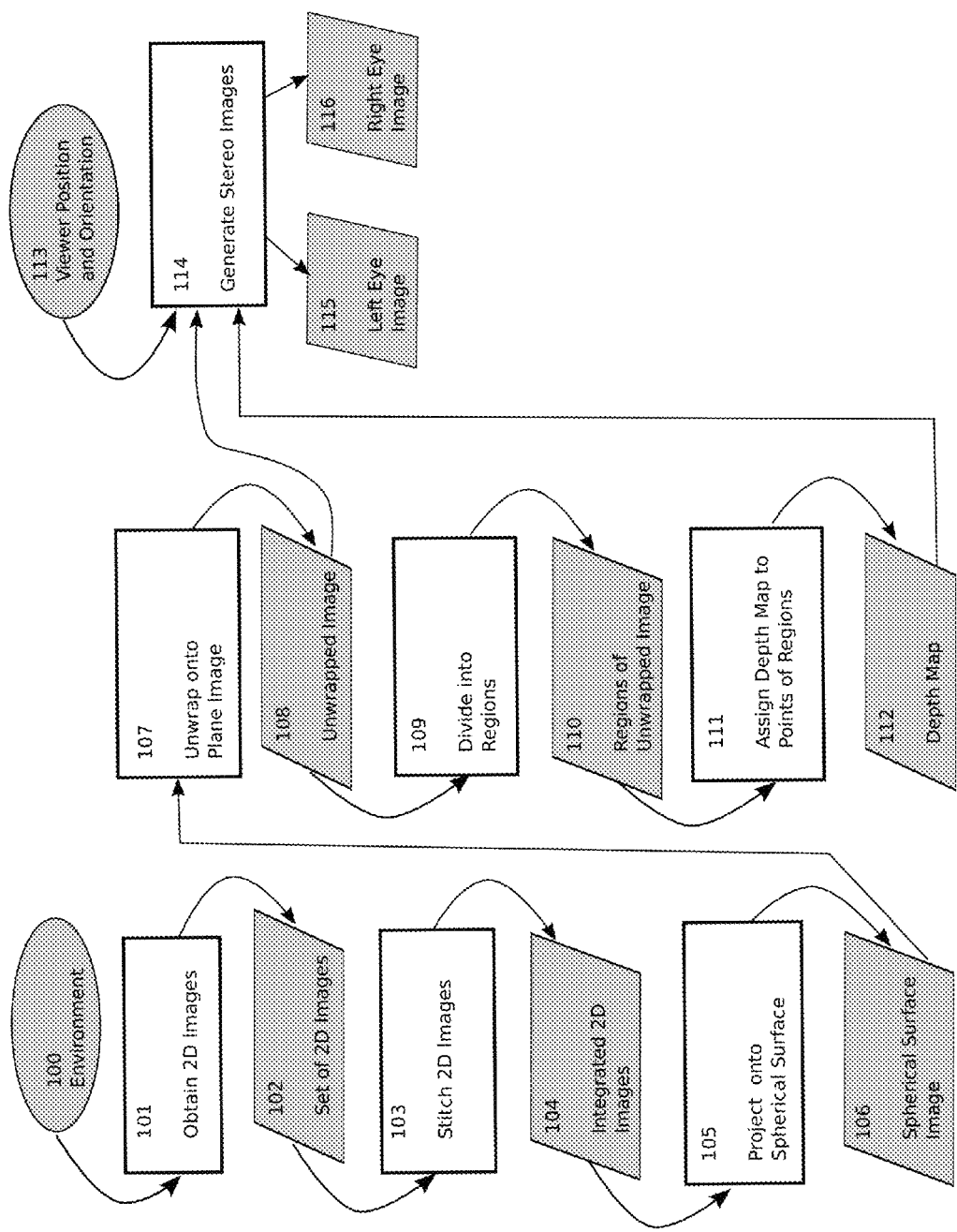

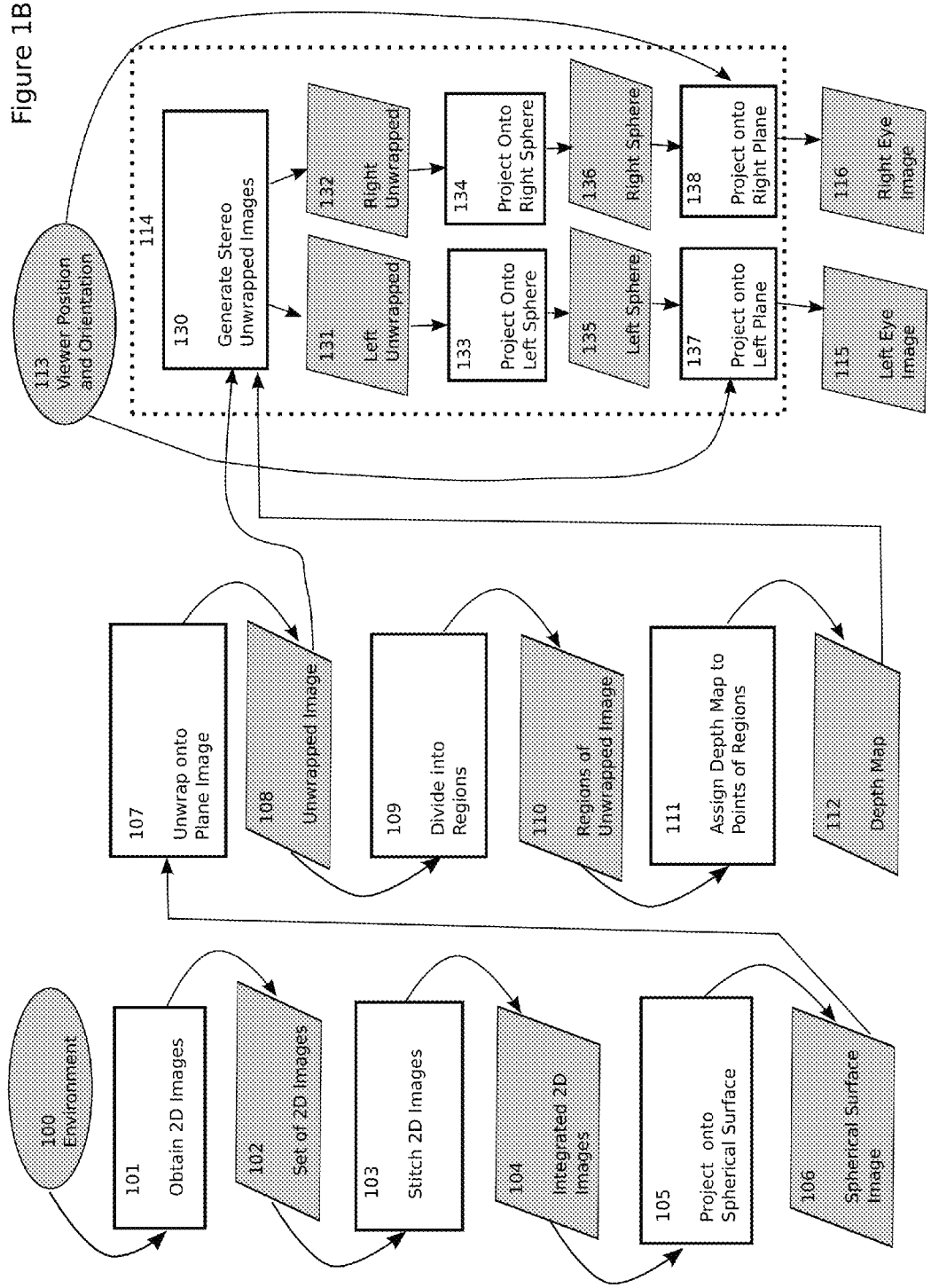

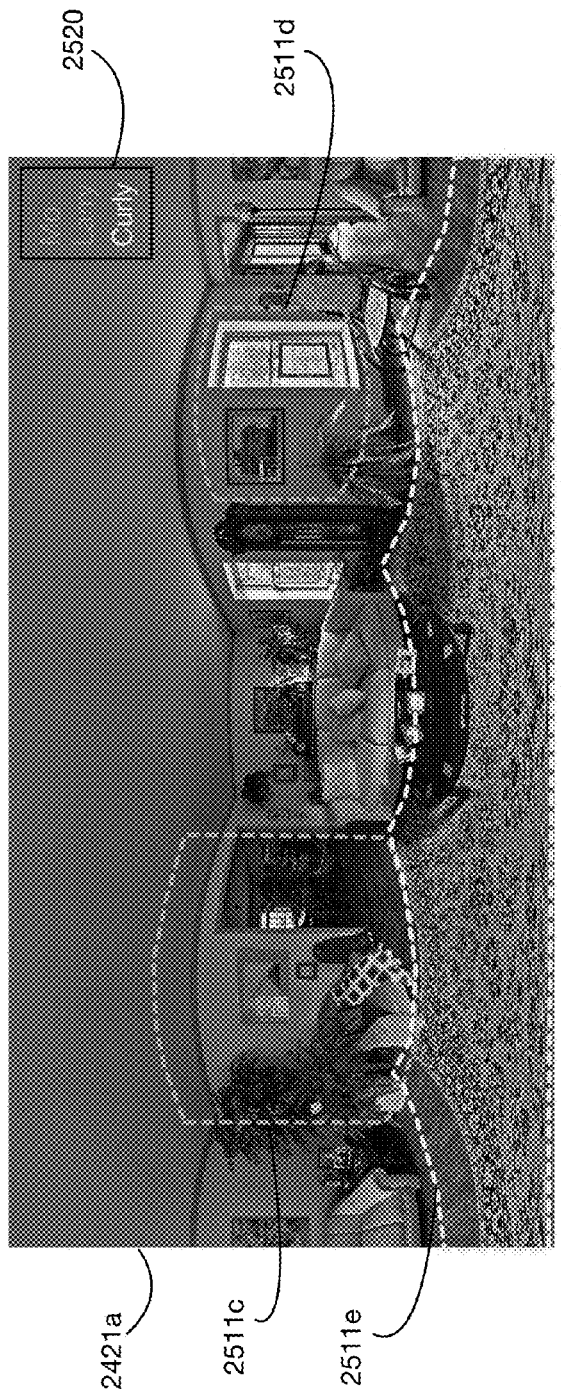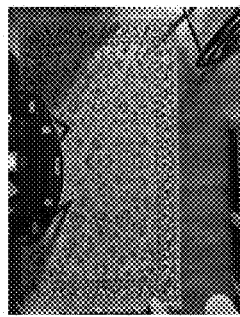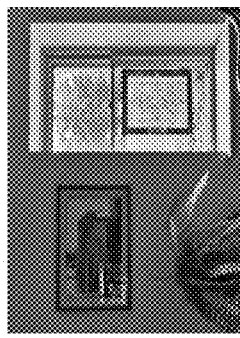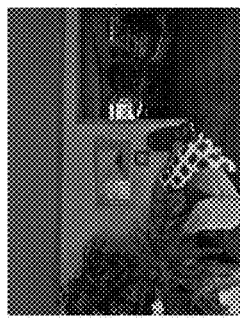
FIG. 25

FIG. 26
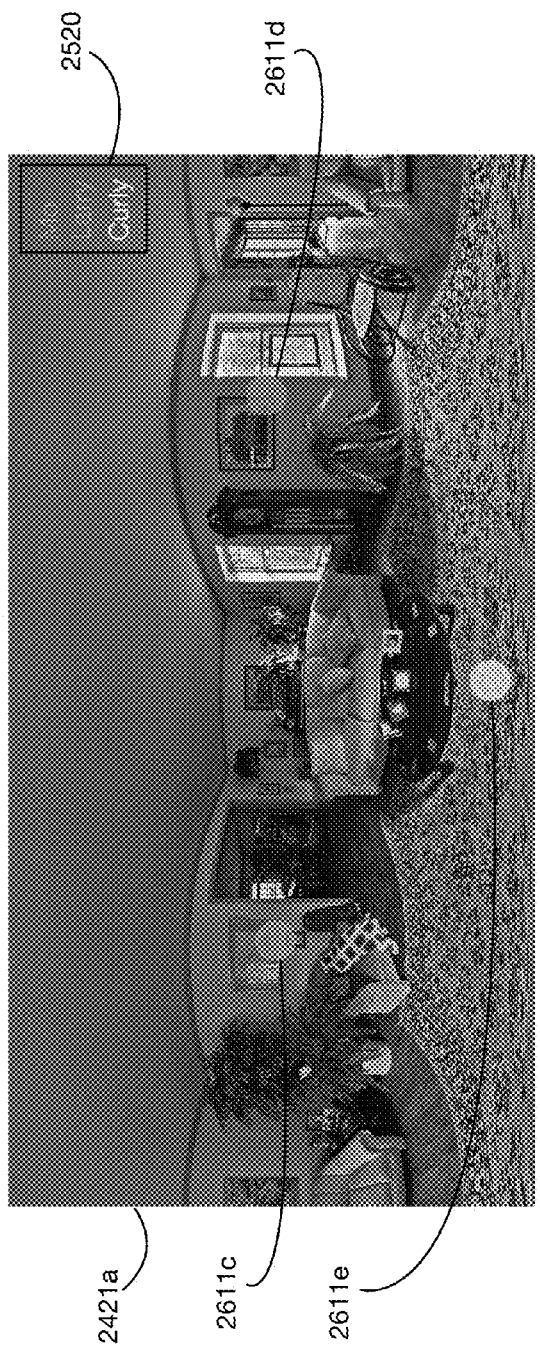
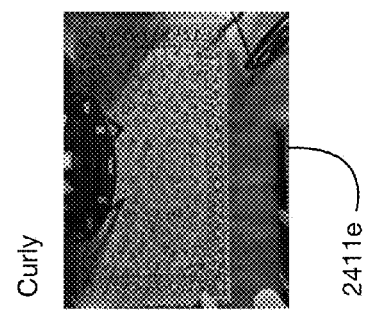
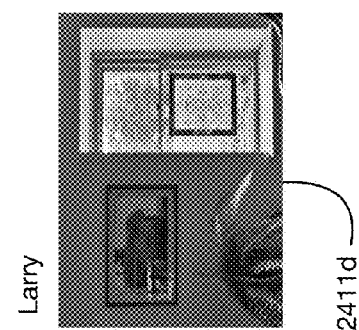
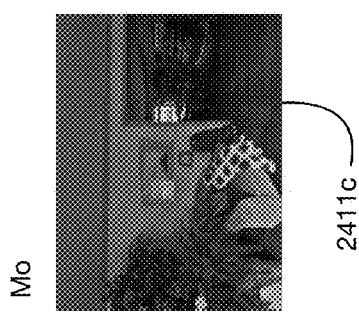

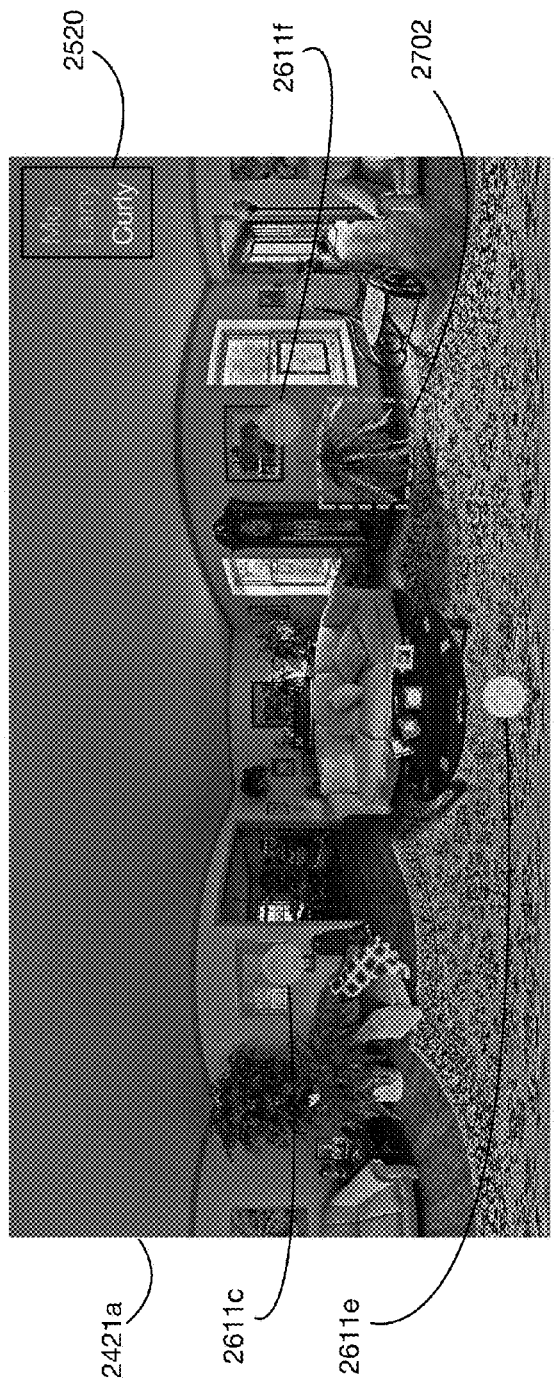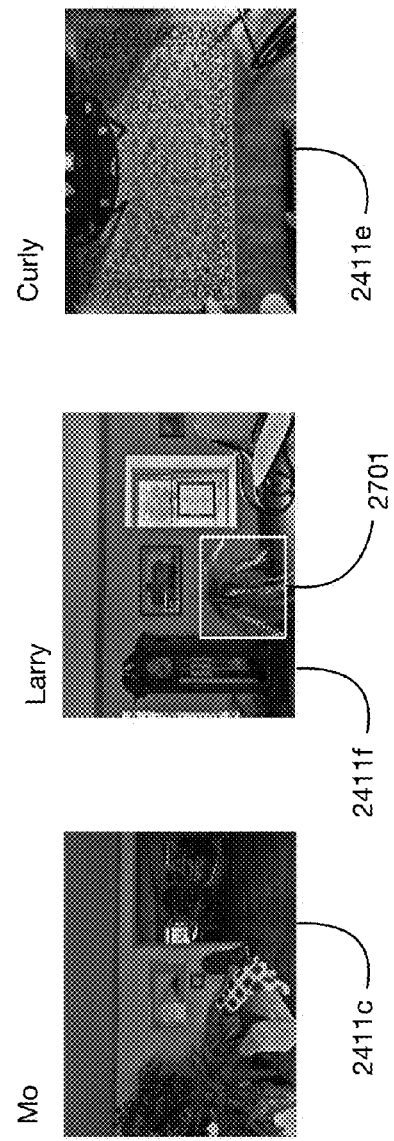
FIG. 27

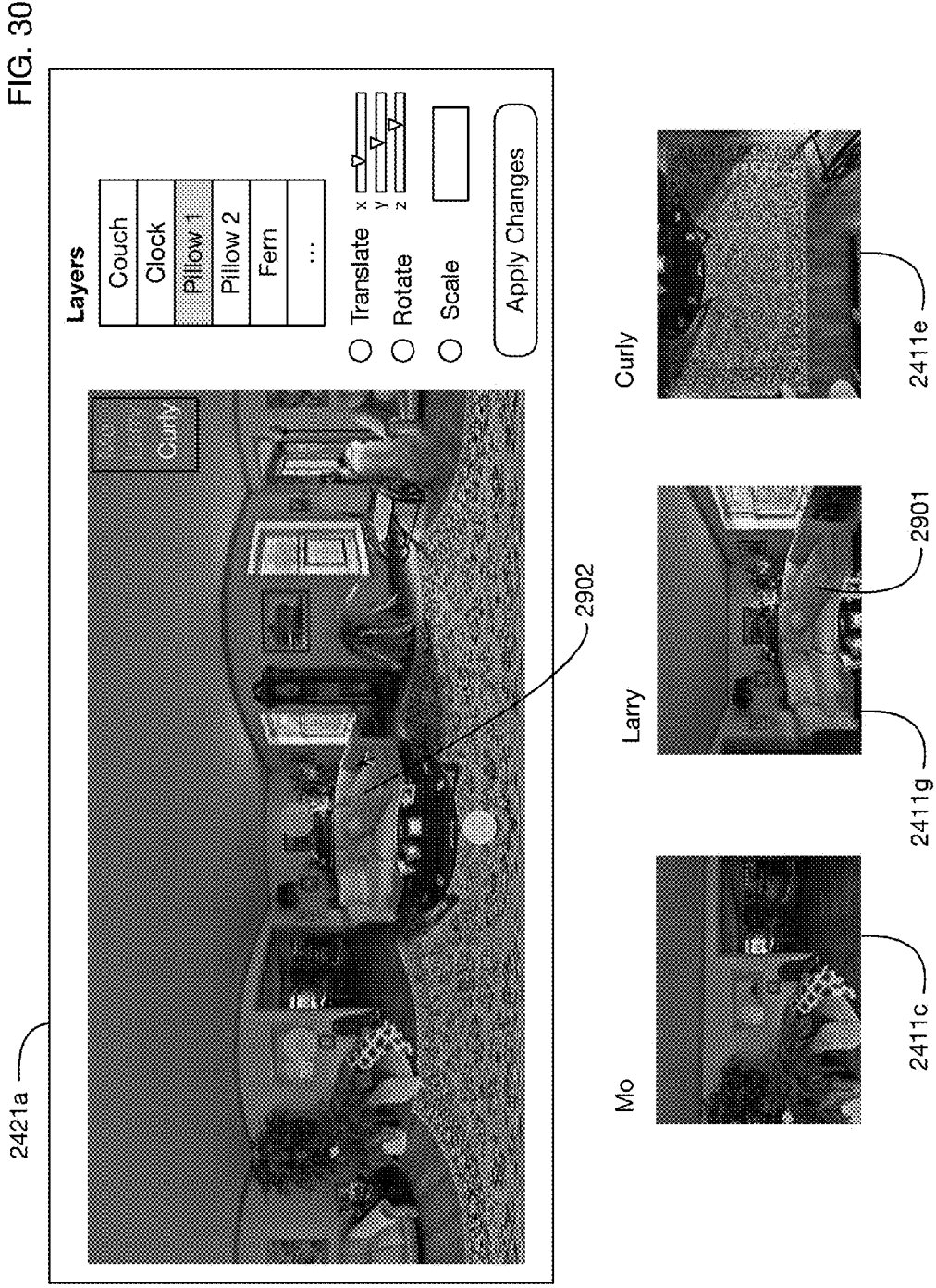

3D MODEL MULTI-REVIEWER SYSTEM

This application is a continuation in part of U.S. Utility patent application Ser. No. 14/709,327, filed 11 May 2015, which is a continuation in part of U.S. Utility patent application Ser. No. 13/874,625, filed 1 May 2013, the specifications of which are hereby incorporated herein by reference.

This application is also a continuation in part of U.S. Utility patent application Ser. No. 13/895,979, filed 16 May 2013, which is a continuation in part of U.S. Utility patent application Ser. No. 13/366,899, filed 6 Feb. 2012, which is a continuation in part of U.S. Utility patent application Ser. No. 13/029,862, filed 17 Feb. 2011, the specifications of which are hereby incorporated herein by reference.

BACKGROUND OF THE INVENTION

1. Field of the Invention

One or more embodiments of the invention are related to the field of image analysis and image enhancement, and computer graphics processing of two-dimensional (2D) images into three-dimensional (3D) stereoscopic images. More particularly, but not by way of limitation, one or more embodiments of the invention enable a system for simultaneous review of a 3D model by multiple reviewers, each potentially viewing the model from a different viewpoint, and for coordination of these reviews by a coordinator. Graphical indicators of the reviewers' viewpoints may be overlaid onto an overview image of the 3D model so the coordinator can determine the regions and perspectives of the model that are under review.

2. Description of the Related Art 3D viewing is based on stereographic vision, with different viewpoints from one or more images provided to the left and right eyes to provide the illusion of depth. Many techniques are known in the art to provide 3D viewing. For example, specialized glasses may be utilized for viewing 3D images, such as glasses with color filters, polarized lenses, or anamorphic lenses. Some 3D viewing methods use separate screens for left eye and right eye images, or project images directly onto the left eye and right eye.

Virtual reality environments typically are computer-generated environments that simulate user presence in either real world or computer-generated worlds. The systems utilized to display the virtual reality environment typically include a stereoscopic display for 3D viewing and generally instrument a viewer with one or more sensors, in order to detect and respond to the position, orientation, and movements of the viewer. Based on these values, the virtual reality environment generates images to provide an immersive experience. The immersive experience may also include other outputs such as sound or vibration. Images may be projected onto screens, or provided using specialized glasses worn by the user.

The vast majority of images and films historically have been captured in 2D. These images or movies are not readily viewed in 3D without some type of conversion of the 2D images for stereoscopic display. Thus 2D images are not generally utilized to provide realistic 3D stereoscopic virtual reality environments. Although it is possible to capture 3D images from stereoscopic cameras, these cameras, especially for capturing 3D movies, are generally expensive and/or cumbersome 3D cameras. Specifically, there are many limitations with current 3D camera systems including prices and precision of alignment and minimum distance to a subject to be filmed for example.

The primary challenge with creating a 3D virtual reality environment is the complexity of generating the necessary stereo images for all possible positions and orientations of the viewer. These stereo images must be generated dynamically in approximately real-time as the viewer moves through the virtual reality environment. This requirement distinguishes 3D virtual reality from the process of generating 3D movies from 2D images as the location of the viewer is essentially fixed at the location of the camera.

Approaches in the existing art for 3D virtual reality rely on a detailed three-dimensional model of the virtual environment. Using the 3D model, left and right eye images can be generated by projecting the scene onto separate viewing planes for each eye. Computer-generated environments that are originally modeled in 3D can therefore be viewed in 3D virtual reality. However, creating these models can be extremely time-consuming. The complexity of creating a full 3D model is particularly high when it is desired to create a photo-realistic 3D model of an actual scene. This modeling effort requires that all shapes be defined and positioning in 3D in great detail, and that all colors and textures of the objects be set to match their counterparts in the real scene. Existing techniques for creating 3D virtual environments are therefore complex and time-consuming. They require extensive efforts from graphic artists and 3D modelers to generate the necessary realistic 3D models. Hence there is a need for a method for creating 3D virtual reality from 2D images.

The process of creating a 3D virtual reality is typically iterative. 2D images and possibly computer-generated elements are modeled in 3D space using depth assignments. Stereoscopic 3D images are then rendered from the 3D models and reviewed for accuracy and artistic effects. Typically, these reviews identify adjustments that are needed to the 3D models. These adjustments are applied, and the revised model is re-rendered for a subsequent review. This process may repeat several times. It is time consuming because the modifications to the 3D models and the rendering of images from these 3D models are labor intensive and computationally intensive and may be impossible in real-time. There are no known methods that provide rapid depth update and review cycles for virtual reality models. There are no known methods that allow editors to modify depth and immediately observe the effect of these depth changes on the stereoscopic images. Hence there is a need for a method for real-time depth modification of stereo images for a virtual reality environment.

Reviewing and adjusting a 3D model often requires rendering images of the model from many different viewpoints. A single reviewer typically reviews the model from a single viewpoint at a time in order to check that the model appears accurate and realistic from that viewpoint. Because it is time consuming for a single reviewer to check a model from many different viewpoints, parallel reviews of the model by multiple reviewers may be used. However, there are no known systems that coordinate these multiple simultaneous reviewers of a 3D model. Existing processes treat each review as an independent quality check, and they accumulate reviewer comments at the end each review. No existing systems are configured to coordinate review information from multiple viewpoints simultaneously. Hence there is a need for a 3D model multi-reviewer system.

BRIEF SUMMARY OF THE INVENTION

Embodiments of the invention enable a system for coordination of multiple, simultaneous reviews of a 3D model, potentially from different viewpoints. A set of 2D images may be obtained from an environment, which may for example be a real physical environment such as a room, a computer-generated environment, or a mix of physical and computer-generated elements. 2D images may be captured using a camera aimed at various angles to form a panoramic collection of images covering a desired part of a scene. In some embodiments the collection of images may cover an entire sphere, providing 360° viewing in all directions (including left-to-right and up and down). Embodiments of the invention enable converting these 2D images into a 3D virtual reality experience. A viewer in the virtual reality environment may be able to view the environment from various locations and orientations, and perceive three-dimensional depth reflecting the physical or modeled characteristics of the captured scene.

In one or more embodiments of the invention, subsets of the 2D images are first stitched together, using for example common features or overlapping pixels. The integrated, stitched images may then be projected onto a spherical surface to form a complete 360-degree view of the scene (or a desired portion thereof) in any direction (left to right as well as up and down). The spherical surface provides a complete spherical view of the scene, but this view is still two-dimensional since it lacks any depth information. Embodiments of the invention enable addition of depth information to the spherical display. In one or more embodiments, the spherical surface image is unwrapped onto a plane. This unwrapped image may be divided into regions to assist in generating depth information. Depth information is generated for the points of the regions. Depth may be applied to the regions manually, via external depth information sources, calculated based on any portion of the underlying image data including hue, luminance, saturation or any other image feature or any combination of acceptance of manual depth or external depth or calculation of depth. Depth information may comprise for example, without limitation, depth maps, bump maps, parallax maps, U maps, UV maps, disparity maps, ST maps, point clouds, z maps, offset maps, displacement maps, or more generally any information that may provide a three-dimensional shape or three-dimensional appearance to an image. Using the spherical surface image and the assigned depth information for the points of the regions, 3D stereoscopic images may be generated for a viewer in a 3D virtual reality environment. The depth information determines the amount of offset for each point between the left eye and right eye images, which provides a three-dimensional viewing experience.

Different embodiments of the invention may use various methods for generating the stereo images using the depth information. In one or more embodiments, the depth information may be projected onto a sphere, yielding spherical depth information that provides depth for all or a portion of the points on the sphere. Spherical depth information may comprise for example, without limitation, spherical depth maps, spherical bump maps, spherical parallax maps, spherical U maps, spherical UV maps, spherical disparity maps, spherical ST maps, spherical point clouds, spherical z maps, spherical offset maps, spherical displacement maps, or more generally any information that may provide a three-dimensional shape or three-dimensional appearance to a spherical surface. The unwrapped plane image is also projected onto a spherical surface to form the spherical image. Left and right eye images may then be generated using the spherical depth information. For example, if the depth information is a depth map that provides a z-value for each pixel in one or more 2D images, the spherical depth information may be a spherical depth map that provides a z-value for each point on the sphere. In this case left and right images may be formed by projecting each image point from its spherical depth position onto left and right image planes. The position and orientation of the left and right image planes may depend on the position and orientation of the viewer in the virtual reality environment. Thus the stereo images seen by the viewer will change as the viewer looks around the virtual reality environment in different directions. The projections from the spherical depth map points onto the left and right image planes may for example use standard 3D to 2D projections to a plane using a different focal point for each eye.

In other embodiments of the invention a different method may be used to generate the stereographic images. This method first generates a stereo image in 2D using the unwrapped plane image and the plane depth information. The left and right images are then projected onto spheres, with a separate left sphere and right sphere for the left and right images. Based on the position and orientation of the viewer in the virtual reality environment, left and right image planes and eye positions are calculated, the left sphere is projected onto the left image plane, and the right sphere is projected onto the right image plane.

In one or more embodiments, the regions of the unwrapped plane image may be used to assist in creating the depth information. One or more regions may be mapped onto flat or curved surfaces, and these surfaces may be positioned and oriented in three-dimensional space. In some embodiments constraints may be applied manually or automatically to reflect continuous or flexible boundaries between region positions in space. Depth information may be generated directly from the region positions and orientations in three-dimensional space by relating the depth to the distance of each point from a specified viewpoint.

In some embodiments it may be desirable to modify the 2D images from the scene in order to create a 3D virtual reality environment. For example, objects may be captured in the 2D images that should not appear in the virtual reality environment; conversely it may be desirable to insert additional objects that were not present in the 2D images. Operators may edit the original images, the unwrapped 2D image, the spherical images, or combinations of these to achieve the desired effects. Removing an object from the environment consists of replacing the pixels of the removed object with a suitable fill, which may be obtained automatically from surrounding regions. Adding an object consists of inserting an image and applying the appropriate depth information to the region or regions of the added image. Inserted images may be obtained from real objects or they may be computer generated, or they may be a combination of real images and computer generated images. Objects in the 2D images may also be extended in some embodiments to fill areas that were not captured in the original images, or that are in areas where undesired objects have been removed. Some embodiments may add objects in multiple layers at multiple depths, providing for automatic gap filling when the viewpoint of a viewer in the 3D virtual reality environment changes to reveal areas behind the original objects in the scene.

One or more embodiments enable a system and method for rapidly and efficiently updating stereoscopic images to reflect changes in the depths assigned to objects in the scene. Multiple, iterative depth modifications may be needed in some situations. Artists, editors, producers, and quality control teams may review left and right viewpoint images generated from the virtual environment, and may determine in some cases that the assigned depths are not optimal. One or more embodiments provide a method for applying depth changes without re-rendering the entire virtual reality scene to create new left and right images from the 3D model of the virtual environment. In one or more embodiments, a 3D model of a virtual reality environment is created or obtained, for example using the image stitching techniques described above. One or more embodiments may generate a spherical translation map from this 3D model that may be used to apply depth updates without re-rendering. A spherical translation map may for example assign translation values to points on the sphere, where the translation value for a point is a function of the distance between the viewer (at the center of the sphere) and the closest object in the scene along the ray between the viewer and that point of the sphere. A translation map may be for example, without limitation, a depth map, a parallax map, a disparity map, a displacement map, a U map, or a UV map. For example, a parallax map contains left and right pixel offsets directly. A depth map contains depth values that are inversely proportional to pixel offsets. Any map that can be used to determine pixel offsets between left and right viewpoint images may be used as a spherical translation map.

In one or more embodiments, an initial stereoscopic (left and right) pair of images may be rendered from the 3D model, along with the spherical translation map. Subsequent modifications to the depth of selected objects may be made by directly editing and modifying the spherical translation map, rather than modifying and re-rendering the 3D model. This process provides a rapid and efficient method for modifying depth after left and right images are created.

Any left and right images from any user viewpoint may be used to review the 3D model for the virtual reality environment. For example, in one or more embodiments reviewers may use one or more planar image projections from one or more directions. In one or more embodiments reviewers may use panoramic images generated from the 3D virtual environment to review and possibly modify the depth assignments. These panoramic images may for example include a full 360-degree horizontal field of view and a full 180-degree vertical field of view, or they may in other cases be partial panoramas covering only a subset of the user's entire field of view. Updates to left and right viewpoint images from spherical translation map modifications may be made to any stereoscopic images generated from the scene, including both planar projections and panoramic images.

One or more embodiments may apply the above methods for real-time, rapid update of stereo images using spherical translation maps to any 3D model of a virtual reality environment. A 3D model of a virtual reality environment may for example be created from camera images of a real scene, from computer-generated elements, or from combinations of real images and computer-generated elements. A 3D model may be created by assigning depth to computer-generated elements or to geometrical surfaces onto which images are projected. Embodiments may create spherical translation maps from the 3D model and use these spherical translation maps to modify stereoscopic images without re-rendering.

One or more embodiments may enable simultaneous reviews of 3D models by multiple reviewers. Because it may be desirable to review a 3D model from multiple viewpoints, use of multiple simultaneous reviewers may dramatically shorten the time needed to complete a review. However, simultaneous review by multiple reviewers presents a challenge in coordinating the activities of the reviewers. In particular, during reviews of complex models from many different viewpoints, it may be difficult to track what each reviewer is observing at any point in time. Lack of coordinated viewpoint tracking may for example lead to communication problems. For example, if a reviewer comments that the depth of an object should be changed, it may not be clear precisely which object the reviewer is referring to. In addition, real-time, iterative updates of 3D models may require rechecking objects from various viewpoints; therefore it may be critical to coordinate the viewpoints used by each reviewer during the review process.

One or more embodiments enable a system for multi-reviewer reviews of 3D models that adds a central coordinator who receives information about each reviewer's activities. In one or more embodiments, multiple review stations are operated by multiple reviewers, and a coordinator station is operated by a coordinator; each station has access to a 3D model under review. Review stations and the coordinator station have displays that show various views of the 3D model.

A review station may have a viewpoint renderer that renders one or more viewpoint images of the 3D model from a particular position and orientation. Viewpoint images may be monoscopic or stereoscopic. The position or orientation (or both) may for example be measured by sensors attached to a reviewer. These sensors may for example be integrated into a virtual reality headset that the reviewer uses to review the 3D model. In one or more embodiments a reviewer may select a viewpoint, using for example a mouse or joystick. A review station may include a reviewer pose subsystem, which may measure or obtain the pose of the reviewer. The reviewer pose subsystem may include sensors, input devices, graphical user interface controls, or any combination of hardware and software configured to measure or obtain the pose of the reviewer. The reviewer pose subsystem provides the reviewer's pose to the viewpoint renderer, which renders one or more viewpoint images of the 3D model based on the pose.

A review station may also include a reviewer focus subsystem, which determines the current focus region or regions within the reviewer's field of view. These focus regions indicate the areas of the 3D model that the reviewer is currently observing, checking, or commenting upon. Embodiments may use various techniques to determine a reviewer's focus regions. For example, one or more embodiments may consider a reviewer's entire field of view to be the focus region. One or more embodiments may use other techniques to locate objects or regions within the field of view that represent the reviewer's current focus.

In one or more embodiments, reviewer focus regions are communicated to the coordinator station. The coordinator station may include a model overview renderer that renders one or more overview images of the 3D model. The overview render may also add graphical indicators to these overview images to represent the reviewer focus regions. These graphical indicators may be for example overlays of icons, shapes, curves, or labels onto the overview images. The coordinator may therefore be able to see the 3D model and the current focus regions of each reviewer in a single set of integrated overview images.

In one or more embodiments, the location of the graphical indicators of reviewer focus areas may correspond to the location of the reviewer focus regions within the 3D model. For example, in a 3D model for a virtual reality environment that is projected onto a sphere, the center of a reviewer's field of view may be represented by a point on the surface of the sphere. An overview image of the sphere that is a two dimensional projection of the sphere (such as a lat-long projection for example) may for example locate graphical indicators of a reviewer's focus area at the corresponding point on the two dimensional spherical projection.

One or more embodiments may differentiate the graphical indicators of focus areas for different reviewers using various visual characteristics, such as for example different colors, shapes, sizes, patterns, textures, icons, or labels.

Embodiments may determine reviewer focus areas based on the specific requirements of their application. In one or more embodiments, reviewer focus areas may be the entire field of view of a reviewer. In one or more embodiments reviewer focus areas may be portions of this field of view, for example a central portion. In one or more embodiments a point at the center of the field of view of a reviewer may be the reviewer focus area.

One or more embodiments may enable reviewers to identify all or a portion of the reviewer focus area. For example, a reviewer may be able to draw a boundary on his or her display to indicate a focus region within which the reviewer has observed an issue. One or more embodiments may further enable a reviewer to add notes or annotations to a designated reviewer focus area. These user-designated focus areas, along with possibly notes or annotations, may be communicated to the coordinator station and displayed with the overview images.

One or more embodiments may enable a coordinator or a reviewer to update the 3D model, or to enter, store, or communicate desired updates that should be applied later to the 3D model. For example, a coordinator station may include a model update subsystem that provides 3D model editing capabilities. In one or more embodiments, updates to the 3D model may be propagated to the review stations to update the viewpoint images in real time or in near real time.

In one or more embodiments a coordinator may have the ability to receive, process, and then remove a reviewer focus region from the coordinator overview display. For example, a reviewer may highlight a region containing an object in the 3D model that should be modified; this region may then appear on the coordinator's overview image. The coordinator may then make a modification to the 3D model (or make a note for a subsequent update) to address the issue. After making the update, the coordinate may remove the update from the queue of review issues requiring attention; this action may result in the graphical indicator for this region being removed from the coordinator's overview screen.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 1 illustrates a flowchart of at least one embodiment of a method for creating 3D virtual reality from 2D images.

FIG. 1B illustrates a flowchart of at least one embodiment of a method for generating 3D virtual reality in which stereo images are generated first in 2D, then projected onto separate left and right spheres, and finally converted to stereo in a 3D viewing environment.

FIG. 25 illustrates an embodiment of a multi-reviewer system that shows the current field of view of each reviewer as an overlay on the coordinator's screen.

FIG. 26 illustrates a variation of the embodiment of FIG. 25, with a colored dot shown on the coordinator's screen for the center of focus of each reviewer.

FIG. 27 illustrates a variation of the embodiment of FIG. 26, with an additional capability for a reviewer to highlight an area on the screen and have this area displayed on the coordinator's overview screen.

FIG. 30 illustrates the embodiment of FIG. 29 after the coordinator has completed the modification, with the highlighted region no longer shown since the edits are finished.

DETAILED DESCRIPTION OF THE INVENTION

Figure 1A:
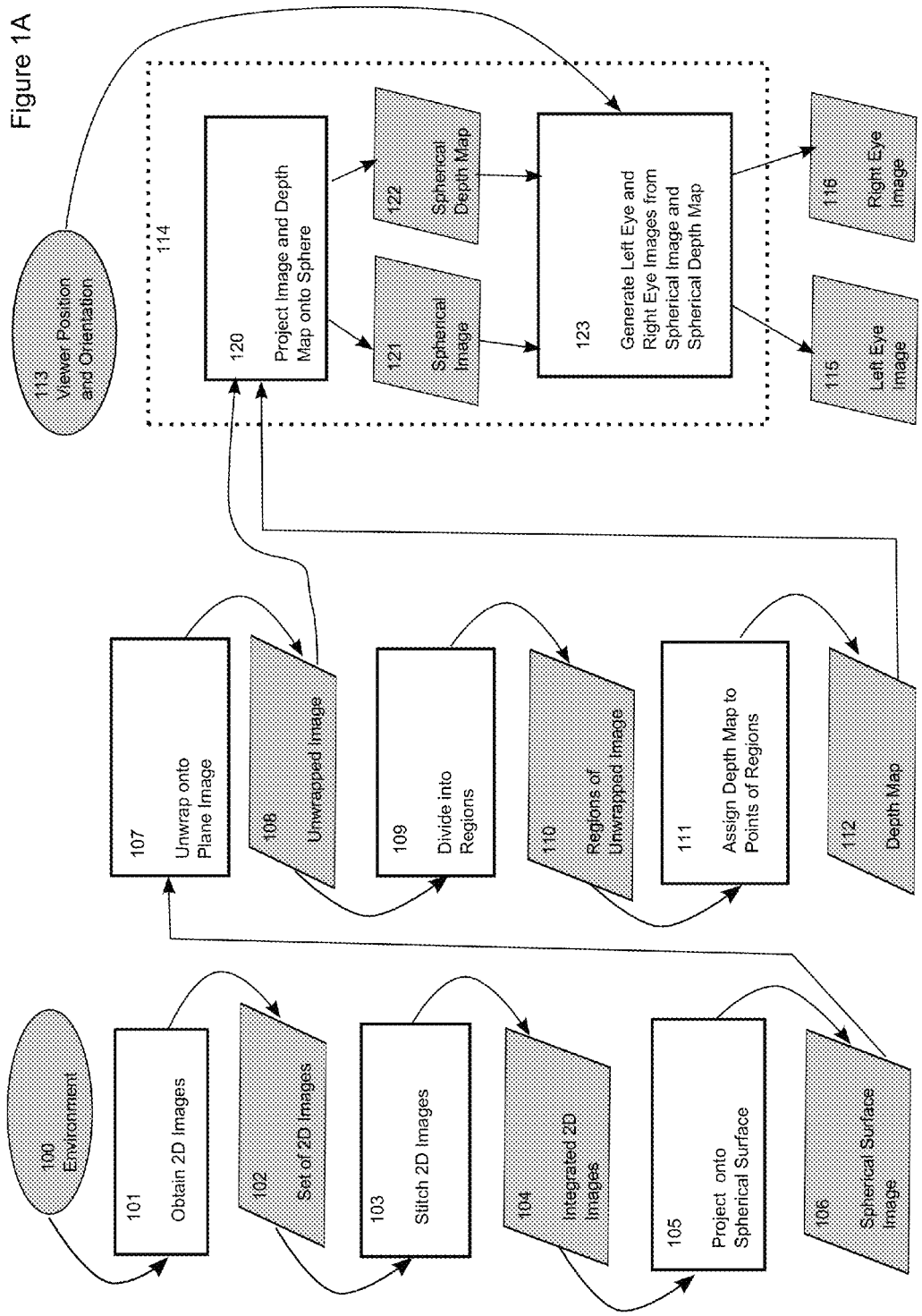
FIG. 1A illustrates a flowchart of at least one embodiment of a method for generating 3D virtual reality in which stereo images are generated using spherical depth information that positions 2D pixels relative to the surface of a sphere in 3D space.

A 3D model multi-reviewer system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 illustrates a flowchart of at least one embodiment of a method for creating 3D virtual reality from 2D images, including exemplary components that may be utilized therewith. In step 101, multiple 2D images are obtained of environment 100, yielding a set of 2D images 102. Environment 100 may for example be a room, an office, a building, a floor, a house, a factory, a landscape, or any other scene or combination of scenes for which a virtual reality experience is to be created. This environment may be real, or it may itself be virtual or computer generated, or it may be a mix of real elements and computer generated elements. The step 101 of obtaining 2D images may use for example one or more cameras—including single image and video cameras—or any other sensor or sensors that capture non-visible frequencies such as radar or lidar. For computer-generated images the cameras may be virtual and the 2D images may be viewing projections of a 2D or 3D computer generated scene. As will be discussed, the depth information associated with an image may be accepted by the system, for example by providing user interface elements for users to draw masks on regions or user interface elements to set parameters for auto-generation of masks for regions of luminance, color or other image parameters. The system thus enables the user to assign depth information to regions in the 2D image or alternatively or in combination, obtain depth via radar or lidar to generate a depth map for example.

Step 103 stitches together subsets of the 2D images 102 into integrated 2D images 104. The stitching process combines and aligns 2D images and eliminates overlap among the 2D images. Stitching step 103 may combine all 2D images into a single panorama, or it may combine subsets of 2D images into various panoramic images that cover portions of the entire environment 100. Different embodiments may employ different stitching strategies. Integrated images may cover all or any portion of the sphere of view directions visible from one or more cameras.

Any known technique for stitching together multiple images into a composite integrated image may be utilized. Stitching may be done manually, automatically, or with a hybrid manual-automatic procedure where one or more operators make rough stitching and software completes the smooth stitch. Embodiments of the invention may utilize any or all of these approaches.

Automated stitching typically aligns the overlap regions of multiple images using a best-fit based on feature differences or on pixel differences. Feature-based methods perform a feature extraction pass first on the images, and then find the location of similar features in multiple images for alignment. See for example: M. Brown and D. Lowe (2007). Automatic Panoramic Image Stitching using Invariant Features. *International Journal of Computer Vision*, 74(1). Pixel-based methods minimize the pixel differences between images in their regions of overlap. See for example: Suen et al. (2007). Photographic stitching with optimized object and color matching based on image derivatives. *Optics Express*, 15(12).

In addition, several existing software packages perform stitching using either of both of these methods; illustrative examples include commonly available photo processing software. Embodiments of the invention may use any of the methods known in the art or available in software packages to perform the image stitching step 103.

In step 105, the integrated 2D images 104 are projected onto a spherical surface. In some embodiments, these projections may use a measured or estimated position and orientation of the camera or cameras used in step 101 to capture the 2D images that formed the integrated 2D images. The output of step 105 is a spherical surface image 106. A spherical surface represents an approximate 3D model of the location of the objects in the environment 100; this approximate model places all points on the objects equidistant from the center of the sphere. Adjustments to this approximate 3D model may be made in subsequent steps using depth information to form more realistic models of the environment.

In step 107 the spherical surface image 106 is "unwrapped" onto an unwrapped plane image 108. This unwrapping process may use any of the spherical-to-plane projection mappings that are known.

In step 109, the unwrapped plane image 108 is divided into regions 110. This step may be done by one or more operators, or it may be assisted by software. For example, software may tentatively generate region boundaries based on shapes, colors, or textures of objects in the unwrapped image 108.

In step 111, depth information 112 is assigned to the points of the regions 110. The depth information is used in subsequent steps to generate the 3D stereo images for a virtual reality experience. Depth information reflects how far away each point of each region is from a viewer. Many techniques for defining and using depth information are known in the art; any of these techniques may be used for generating or using the depth information 112. For example, without limitation, depth information may comprise depth maps, bump maps, parallax maps, U maps, UV maps, disparity maps, ST maps, point clouds, z maps, offset maps, displacement maps, or more generally any information that may provide a three-dimensional shape or three-dimensional appearance to an image. Assigning of depth information may be done by one or more operators. In some embodiments software may be used to assist the step 111 of assigning depth information. For example, operators may be able to rotate or reposition entire regions in a 3D scene, and depth information may be generated automatically for the regions based on this 3D positioning. Software may also be used to generate curved regions or to blend depth information at boundaries between regions.

In step 114, the depth information 112 and the unwrapped image 108 are used as inputs to generate stereo images for a viewer at viewer position and orientation 113. The stereo images consist of a left eye image 115 and a right eye image 116. Any of the commonly available stereo 3D vision technologies, such as special viewing glasses used to see 3D movies, may be used by the viewer to view the virtual reality environment in 3D using these stereo images. For example, viewers may use glasses with different colored left and right lenses, or glasses with different polarization in left and right lenses, or glasses with LCD lenses that alternately show left and right images.

FIGS. 2-9 illustrate exemplary embodiments of the steps of FIG. 1 in greater detail, while FIGS. 1A and 1B are discussed after FIGS. 2-9.

Figure 2:
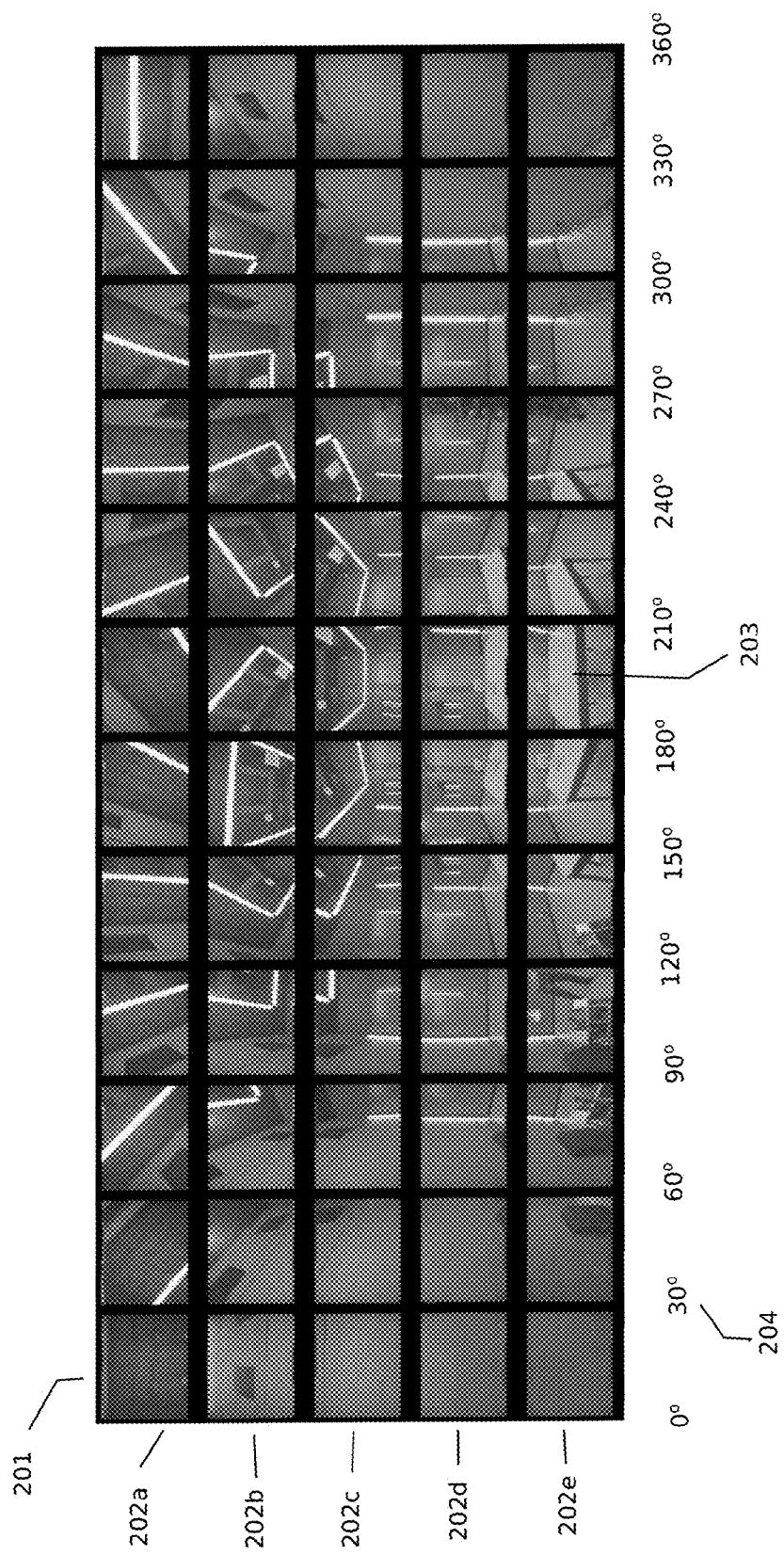
FIG. 2 illustrates an embodiment of a step to capture a series of 2D images of an environment by aiming a camera in varying horizontal and vertical angles.

FIG. 2 illustrates an embodiment of step 101—obtaining 2D images of environment 100. In this example the environment 100 is a room with a table 203 approximately in the center of the room. A series of 2D images 201 is obtained of the room using a camera aimed at different angles. In this example the 2D images 201 are captured in five rows 202a, 202b, 202c, 202d and 202e, where each row corresponds to a vertical angle for the camera. Within each row the camera is aimed at 12 different horizontal angles, with an increment 204 of approximately 30° between each horizontal angle, forming a complete 360° panorama of the scene 100. Other embodiments of the invention may use different techniques and angle increments for capturing a series of 2D images to cover a desired portion of an environment 100.

Figure 3:
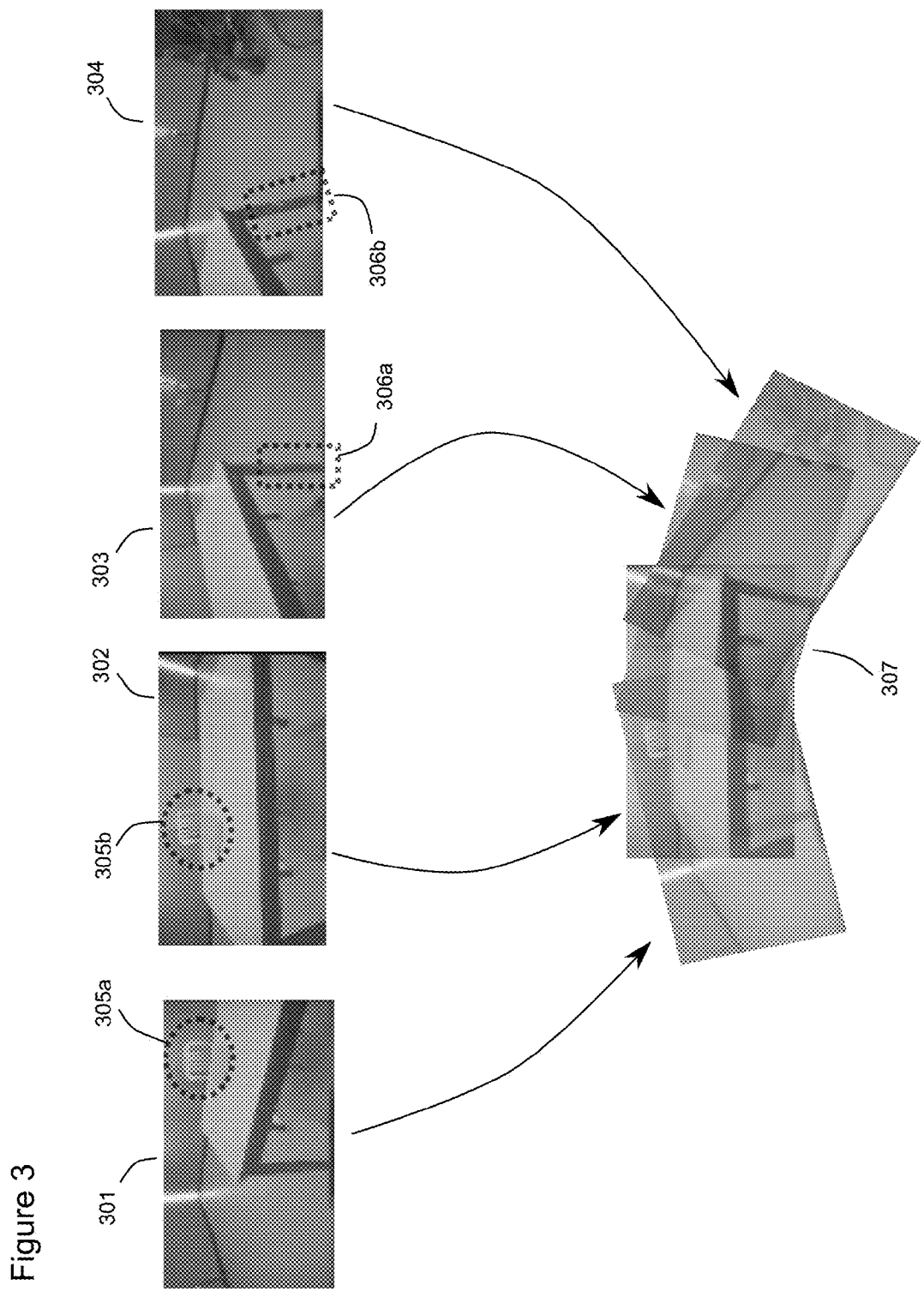
FIG. 3 illustrates an embodiment of a step to stitch sets 2D images together into integrated 2D images; in this illustration four 2D images from FIG. 2 are stitched together into an integrated image by aligning matched features.

FIG. 3 illustrates an embodiment of step 103—stitching together 2D images into integrated images. Image 301, 302, 303, and 304 are individual 2D images from row 202e of FIG. 2. A manual or automated scan for shared features identifies, for example, the back of the chair which appears as 305a in image 301 and as 305b in image 302, and the right front table leg which appears as 306a in image 303 and as 306b in image 304. Aligning the images on these (and other) shared features produces the rough stitch 307. Different embodiments of the invention may use various grouping strategies for stitching together integrated images in step 103. For example, all of the images in a row (such as row 202e of FIG. 2) may be stitched together, or portions of rows (as shown here in FIG. 3) may be stitched together. Stitching may also be done vertically (in columns) in addition to or instead of horizontally (in rows), or with mixed approaches to combine similar images.

Figure 4:
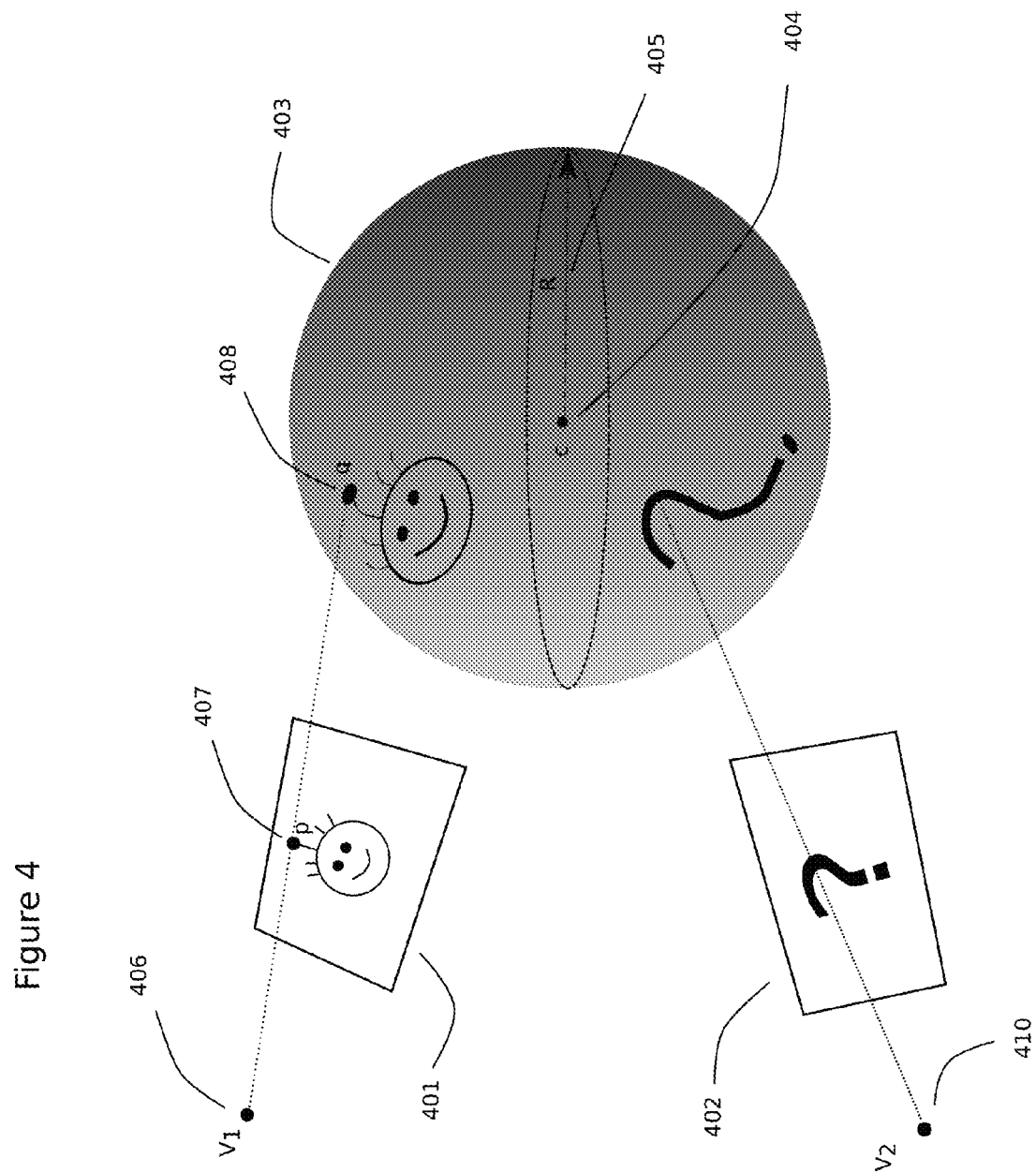
FIG. 4 illustrates an embodiment of a step to project integrated 2D images onto a spherical surface.

FIG. 4 illustrates an embodiment of step 105—projecting the integrated 2D images onto spherical surface 403. Many techniques are known in the art for projecting plane images onto a sphere and for the reverse process of projecting spherical images onto a plane. These techniques are similar to known techniques of cartography, which generate 2D map images of a spherical surface or a portion thereof. For example, maps may use projections such as Mercator, Lambert cylindrical, Azimuthal, Orthographic, and many others. Projecting 2D plane images onto a sphere amounts to reversing the normal map projections that project a sphere onto plane images.

Different embodiments of the invention may employ different projection techniques. FIG. 4 illustrates a spherical projection that may be used in one or more embodiments of the invention. In this projection, each 2D image is considered to be a plane perspective projection of a spherical surface using a fixed point of perspective for the projection. The projection of the 2D image to the sphere simply reverses the perspective projection. Multiple images may be projected to the same spherical surface using location and orientation of the camera when each image was captured.

In FIG. 4 2D images 401 and 402 are projected onto the sphere 403. Sphere 403 has center point c 404, and radius R 405. Image 401 was obtained using a camera with a viewer located at point $v_1$ 406; image 402 was obtained using a camera with a viewer located at point $v_2$ 410. The orientation of the planes of images 401 and 402 correspond to the orientation of the cameras used to capture those images. Each point on the 2D images 401 and 402 is projected to the sphere along a ray from the camera's viewer. For example, point p 407 is projected onto point q 408 on sphere 403. Since the ray from $v_1$ through p is parameterized as $\{v_1+t(p-v_1):t\geq 0\}$, point q can be obtained easily by finding the parameter t such that $|v_1+t(p-v_1)-c|=R$.

Figure 5:
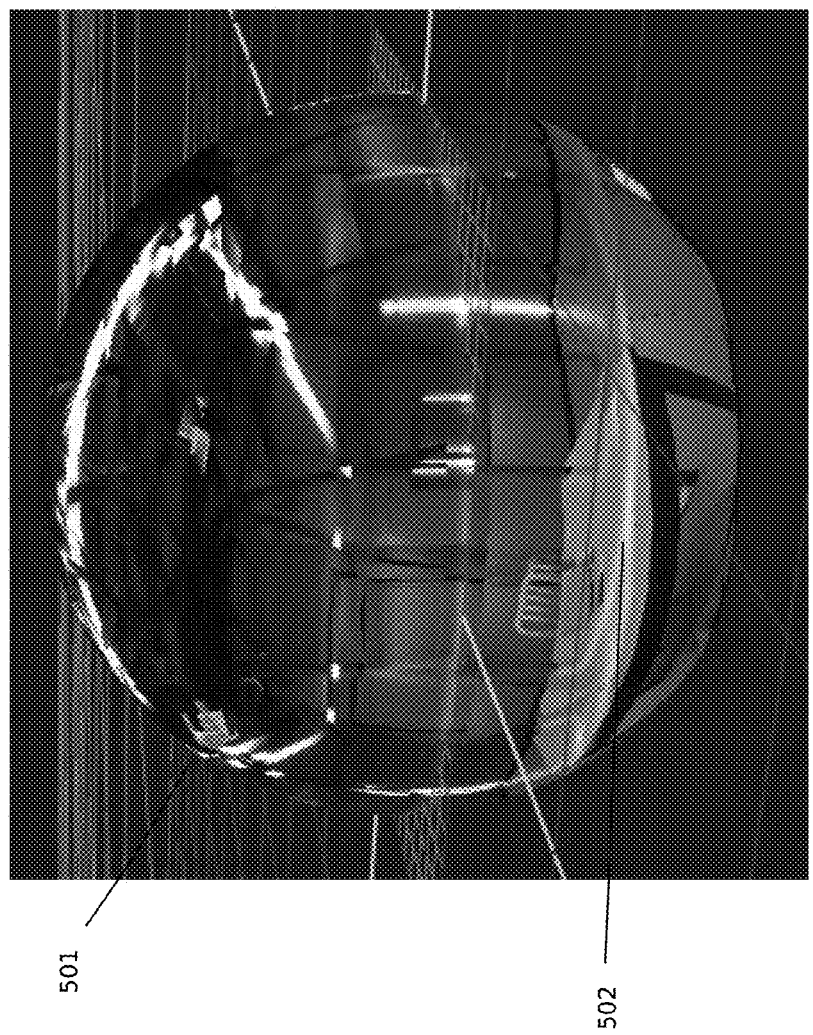
FIG. 5 illustrates an example of a spherical surface image that results from projecting 2D images onto a sphere.

FIG. 5 illustrates a spherical projection of the 2D images from FIG. 2. Images are projected onto spherical surface 501. For example, the 2D table image 203 from FIG. 2 appears as image 502 on sphere 501.

Figure 6:
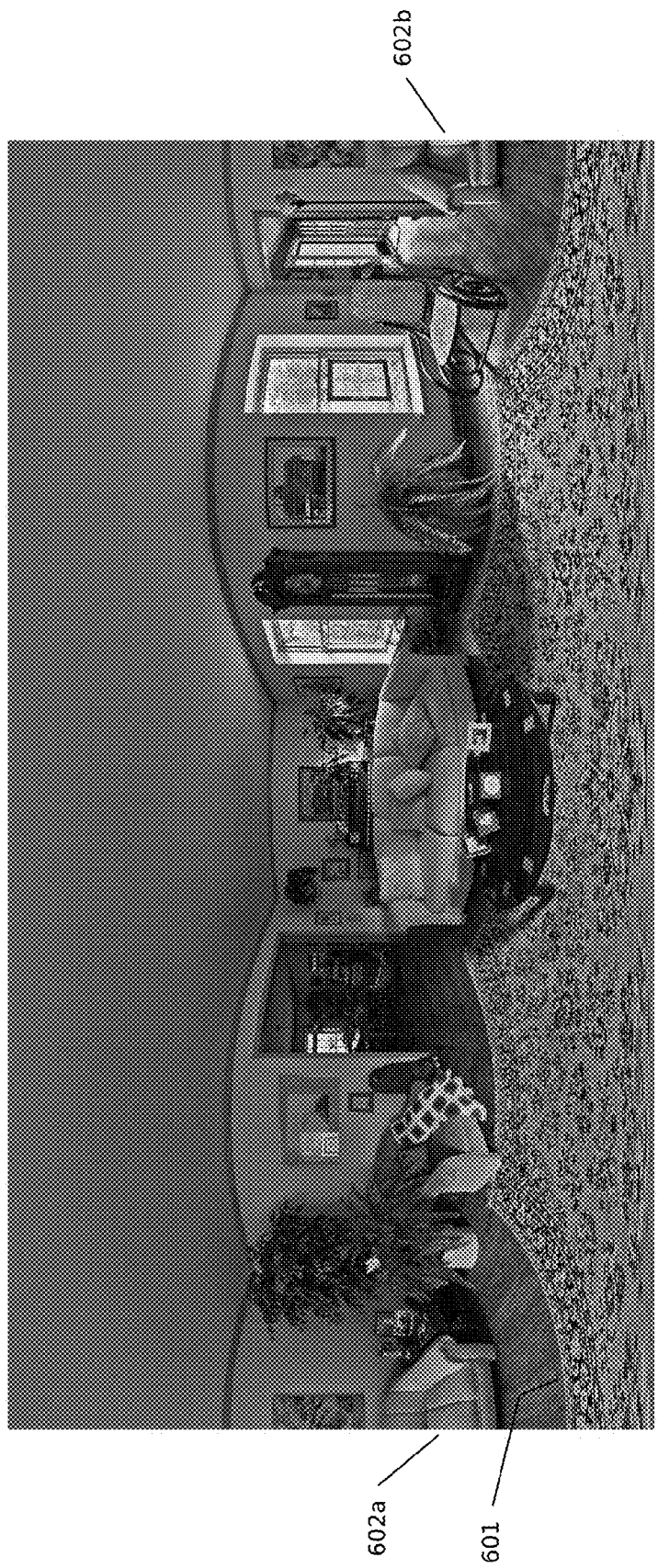
FIG. 6 illustrates an example of a spherical surface image that is unwrapped into a panoramic 2D image. (Note that this scene is different from the scene shown in FIG. 5.)

FIG. 6 illustrates an unwrapped image obtained from a spherical projection via step 107—unwrap onto plane image. Converting the spherical image to a plane unwrapped image amounts to reversing the projections illustrated in FIG. 4 using a single projection of the sphere onto a plane. Note that the scene illustrated in FIG. 6 is not the same scene illustrated in FIGS. 2 and 4. In this unwrapped image the straight edges of the rug appear as curved lines such as 601. The unwrapped image is a 360 degree panorama; for example the left edge 602a of the chair corresponds to the right edge 602b.

Figure 7:
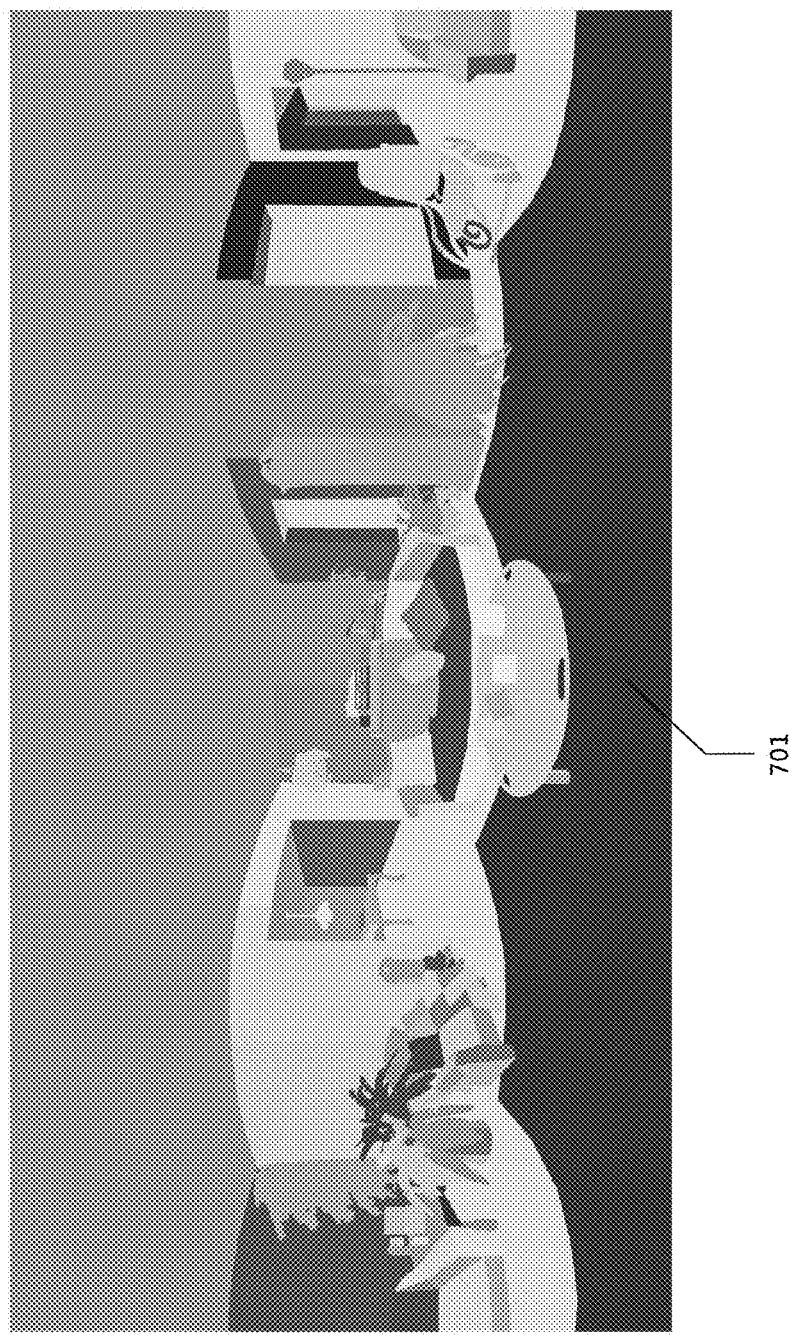
FIG. 7 illustrates an embodiment of a step of dividing the unwrapped image of FIG. 6 into multiple regions; each region is color-coded with a color mask to identify its boundaries.

FIG. 7 illustrates an embodiment of step 109—dividing the unwrapped image into regions—applied to the unwrapped image of FIG. 6. Each region is indicated by a different color mask. For example, the blue mask 701 defines the rug in the center of the room. The system may enable the user to define masks for regions in the image and accept input for the masks by an operator, for example by implementing software on a computer system specifically for that purpose, or using a combination of methods. For example, the rug 601 in FIG. 6 has a distinct color and pattern that may used to automatically or semi-automatically identify the blue mask region 701 in FIG. 7. The system may thus enable the user to input a foreground distance and background distance for mask region 701 for example. Alternatively, radar or lidar may be obtained and utilized to auto generate depths for portions or the entire image or masks or regions therein.

Figure 8:
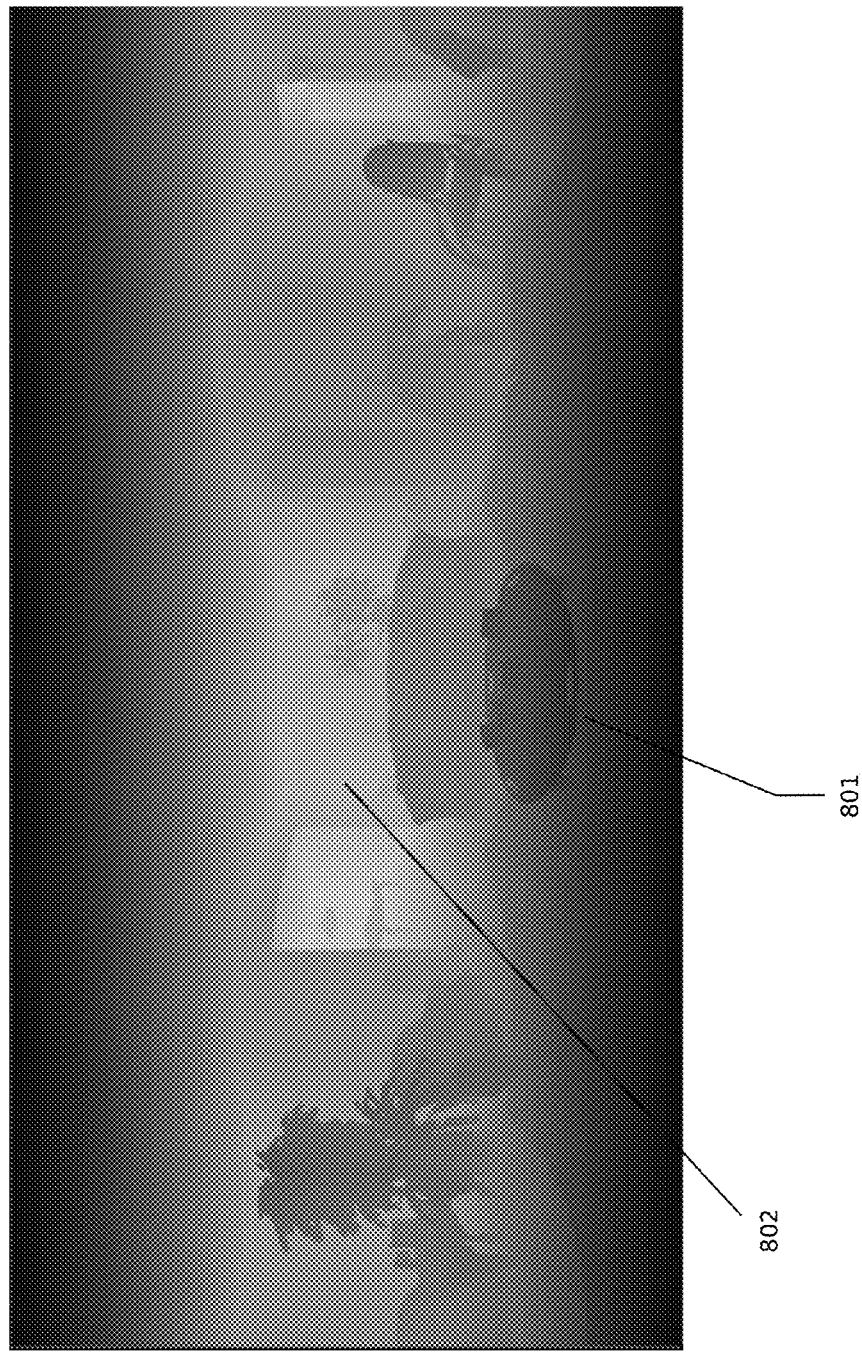
FIG. 8 illustrates an embodiment of a step of assigning a depth map to the points of each of the regions of FIG. 7; darker points are closer to the viewer.

FIG. 8 illustrates an embodiment of step 111—generating depth information for the points of the regions defined in step 109. In the example shown in FIG. 8, the depth information is encoded as a depth map, with points closer to the viewer shown with darker shades of grey, and points further from the viewer shown with lighter shades of grey. For example, the front edge 801 of the table in the center of the room has a dark shade since it is close to a viewer in or near the center of the room; the wall 802 behind the couch has a lighter shade since it is further from the viewer. Operators may assign depth information to individual pixels, or they may use the region masks to assist in defining depth information by positioning and rotating the regions in three dimensional space. Numerical depth information that is not visible, for example compressed or encoded may also be utilized.

Figure 9:
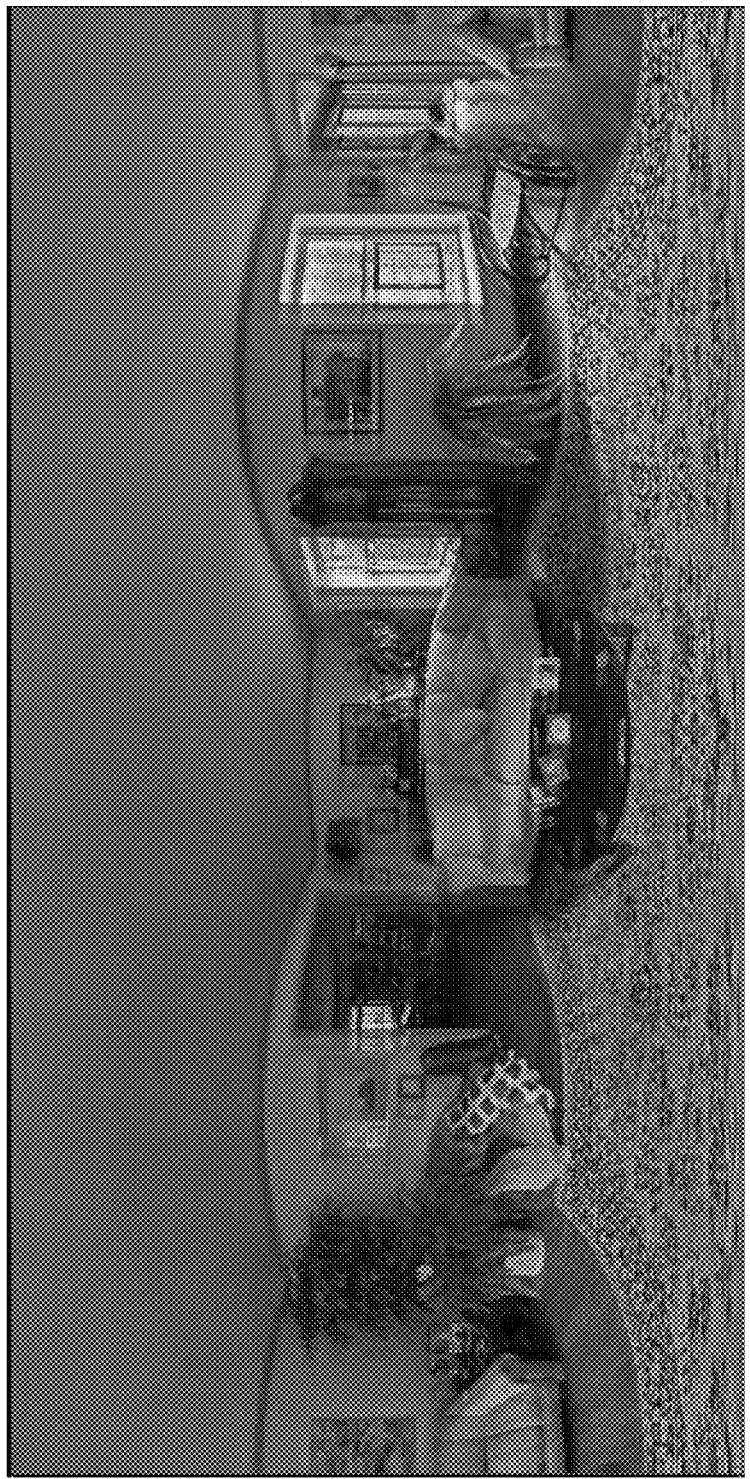
FIG. 9 illustrates an anaglyph 3D stereoscopic view of the scene depicted in FIG. 7 with the depth map of FIG. 8.

FIG. 9 illustrates an embodiment of step 114—generating stereo images. In this example the unwrapped image from FIG. 6 is combined with the depth map from FIG. 8 to generate left and right eye images, which are superimposed here on the same anaglyph image. This anaglyph image provides a 3D stereoscopic view of the scene when viewed through anaglyph glasses with different color filters in the two lenses. The amount of shift between left eye and right eye images for each pixel is a function of the depth map for that pixel.

Returning to FIG. 1, embodiments of the invention may use various techniques in step 114 to generate the stereo images 115 and 116. As illustrated in FIG. 9, embodiments may use the depth information 112 to shift the display of pixels in left eye images versus right eye images, with closer pixels being shifted a greater amount. FIGS. 1A and 1B illustrate specific techniques that may be used by some embodiments of the invention to perform step 114.

Figure 10:
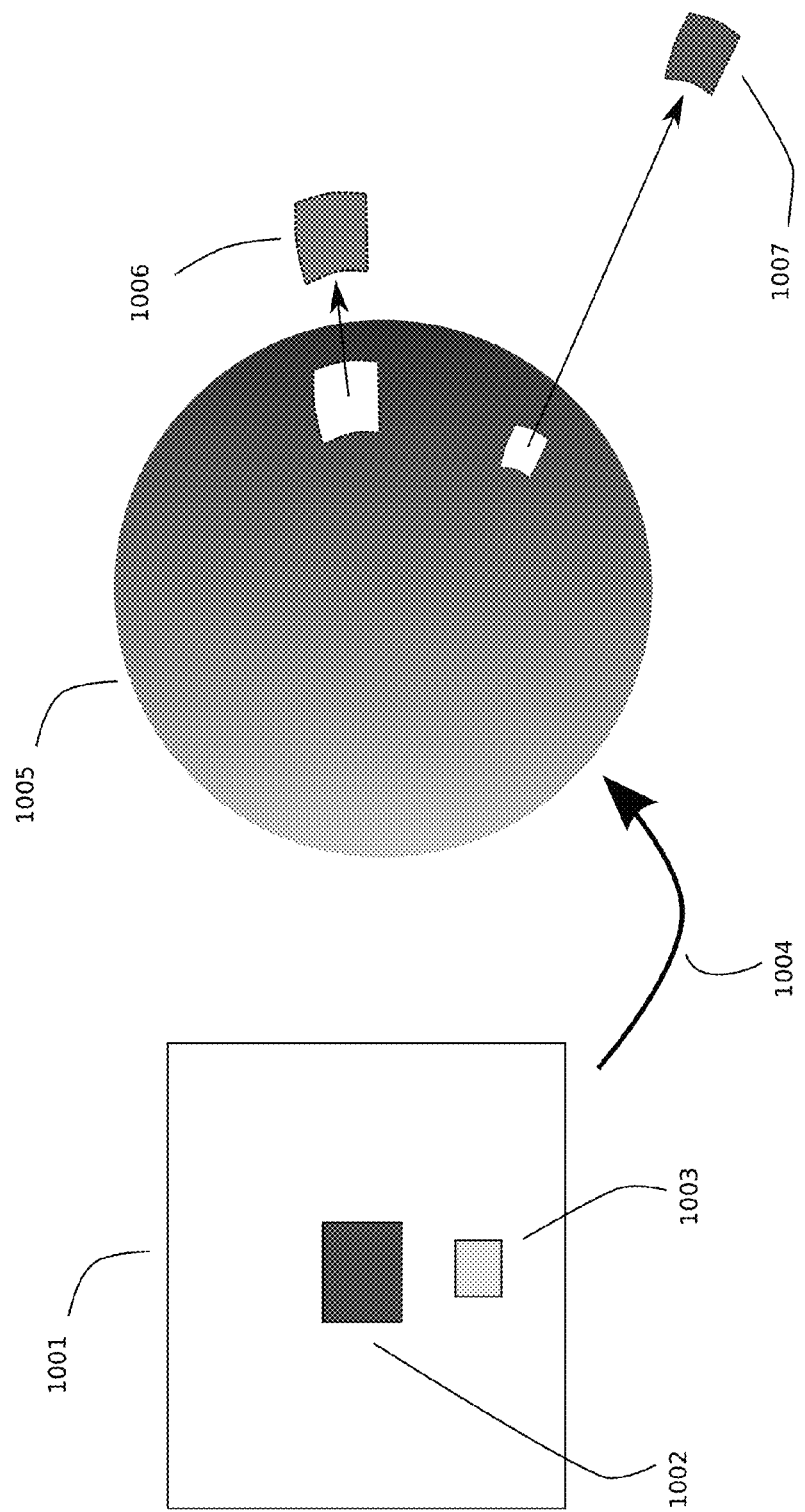
FIG. 10 illustrates an embodiment of a step of creating a spherical depth map from a 2D depth map as outlined in the flowchart of FIG. 1A.

FIG. 1A illustrates a technique wherein step 114 comprises two additional steps 120 and 123. In step 120, the unwrapped image 108 and the depth information 112 are both projected onto a sphere. This process yields spherical image 121 and spherical depth information 122. FIG. 10 illustrates the generation of a spherical depth map, which is an example of spherical depth information 122. Spherical depth information may comprise for example, without limitation, spherical depth maps, spherical bump maps, spherical parallax maps, spherical U maps, spherical UV maps, spherical disparity maps, spherical ST maps, spherical point clouds, spherical z maps, spherical offset maps, spherical displacement maps, or more generally any information that may provide a three-dimensional shape or three-dimensional appearance to a spherical surface. 2D depth map 1001 contains two regions: region 1002 is closer to the viewer (hence shaded darker) and region 1003 is further from the viewer (hence shaded lighter). Depth map 1001 is projected via projection 1004 to the sphere 1005. Regions with greater depth (further from the viewer) are pushed further away from the center of the sphere to form a spherical depth map. Hence spherical region 1006, corresponding to planar region 1002, is closer to the center of sphere 1005 than spherical region 1007, corresponding to planar region 1003.

Figure 11:
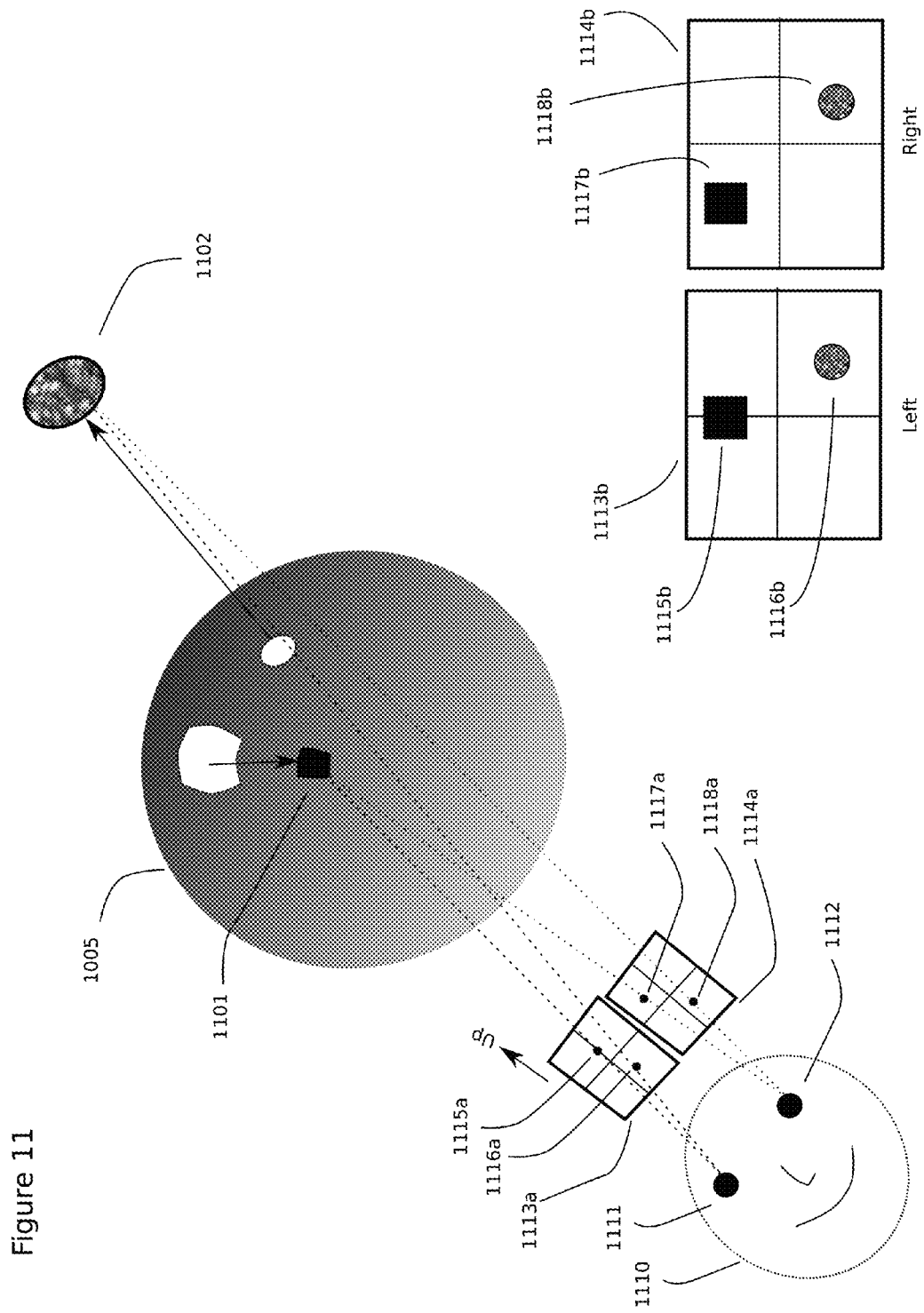
FIG. 11 illustrates an embodiment of a step of generating left and right stereo 2D views from a spherical depth map.

In addition, in FIG. 1A, spherical image 121 and spherical depth information 122 are used in step 123 to generate left eye image 115 and right eye image 116. FIG. 11 illustrates this process in greater detail. Viewer 1110 is observing a virtual reality scene from a specific position and orientation. The viewer 1110 has a left eye position 1111 and a right eye position 1112. 2D images and a 2D depth map have been projected onto sphere 1005. The image contains black colored region 1101, which is located near the center of the sphere, and speckled region 1102, which is located far from the center of the sphere. The left eye image is formed by projecting points from the sphere onto the left eye plane 1113a; similarly the right eye image is formed by projecting points from the sphere onto the right eye plane 1114a. The center point of region 1101 is projected onto point 1115a in the left eye plane, and onto point 1117a in the right eye plane. The center point of region 1102 is projected onto point 1116a in the left eye plane, and onto point 1118a in the right eye plane. The detailed views of the left eye image 1113b and of the right eye image 1114b show that the relative shift of the regions 1101 and 1102 depends on the depth of each region on the spherical depth map: Left eye image 1115b of region 1101 is offset significantly from right eye image 1117b of region 1101, whereas left eye image 1116b of region 1102 is only slightly offset from right eye image 1118b of region 1102.

FIG. 1B illustrates a different technique for forming left and right eye images that may be used by one or more embodiments of the invention. In comparison to the technique illustrated in FIG. 1A, this technique first forms planar stereo images and then projects these onto left and right spheres. This is an alternative technique to that shown in FIG. 1A, which first projects onto a sphere, and then forms stereo images thereafter. In step 130, the unwrapped planar image 108 is combined with the depth information 112 to form a left unwrapped image 131 and a right unwrapped image 132. Each of the unwrapped images 131 and 132 is then projected onto a sphere, forming a left sphere 135 and a right sphere 136. In the final steps 137 and 138 the spheres 135 and 136 are projected on left eye image 115 and right eye image 116 respectively.

Figure 12:
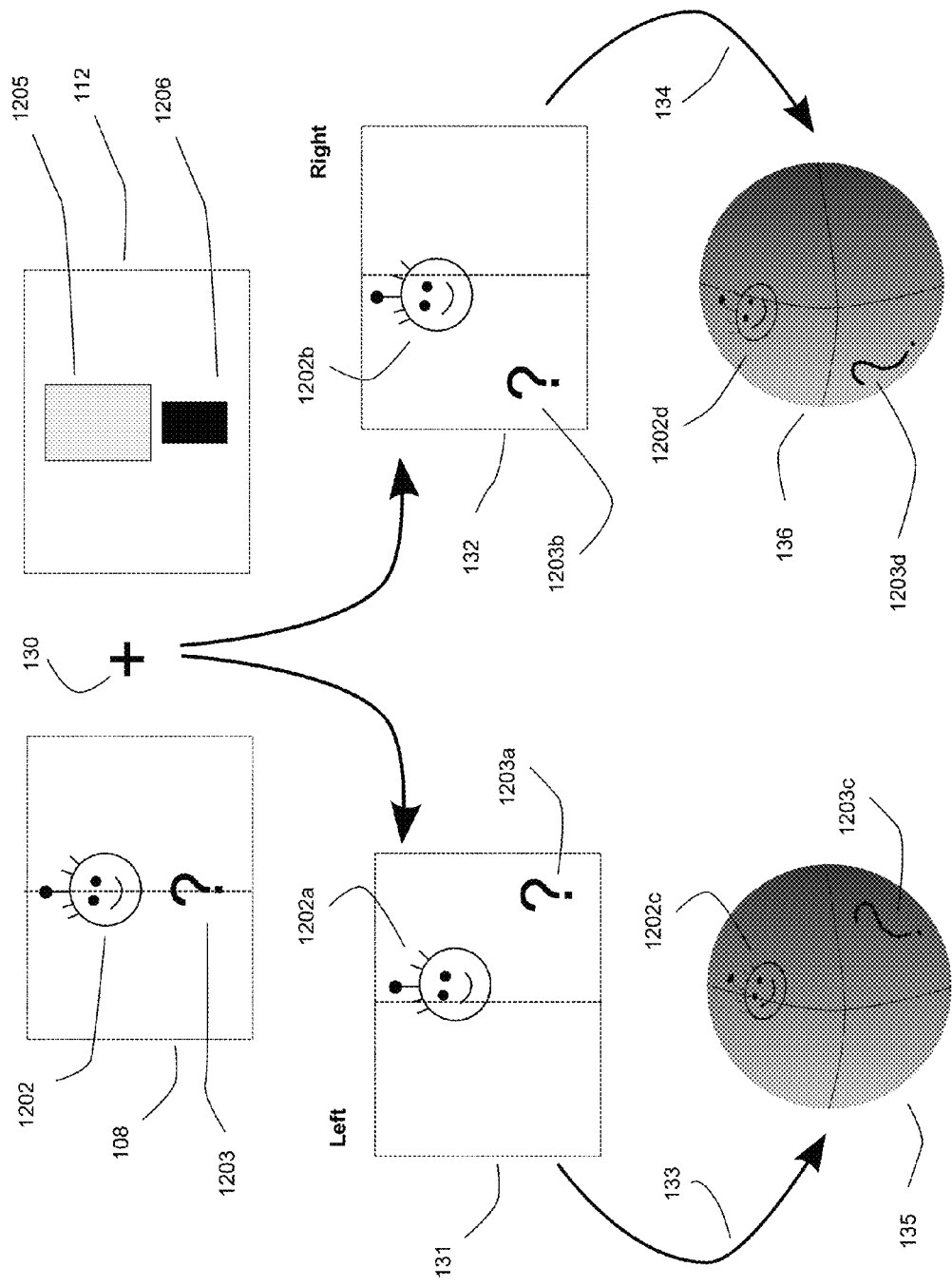
FIG. 12 illustrates an embodiment of a step of generating separate left and right spherical surface images, which are subsequently used to create stereo views, using a 2D image and a 2D depth map, as outlined in the flowchart of FIG. 1B.

FIG. 12 illustrates an embodiment of the details of steps 130, 133 and 134. Unwrapped planar image 108 contains regions 1202 and 1203. Depth map 112 assigns a depth 1205 to region 1202 and a depth 1206 to region 1203; the darker shading of depth 1206 vs. depth 1205 indicates that object 1203 is closer to the viewer than object 1202. Step 130 combines unwrapped image 108 and depth map 112 to form left unwrapped image 131 and right unwrapped image 132. The left image position 1202a of object 1202 is offset only slightly from the right position 1202b of object 1202 based on object 1202's, whereas the left image position 1203a of object 1203 is offset considerably from the right position 1203b of object 1203. These offset differences reflect the depth differences of the objects in depth map 112. In step 133 the left unwrapped image 131 is projected onto left sphere 135. Similarly in step 134 the right unwrapped image 132 is projected onto right sphere 136. These spherical projections can be performed as previously described using any suitable plane-to-sphere projection technique. Left planar image 1202a is projected onto left sphere image 1202c, and right planar image 1202b is projected onto right sphere image 1202d. Similarly left planar image 1203a is projected onto left sphere image 1203c, and right planar image 1203b is projected onto right sphere image 1203d. Returning to FIG. 1B, the steps 137 and 138 generate left eye image 115 and right eye image 116 from the spherical images 135 and 136 respectively. Any of the previously described techniques or any other known technique for projecting from a sphere to a plane may be used for these steps 137 and 138.

Returning again to FIG. 1, the depth information 112 may be generated by assigning a depth to the points of the regions 110 of the unwrapped image. In one or more embodiments of the invention, one or more portions of the depth information may be generated by defining a flat or curved surface for one or more of the regions, and positioning and orienting these surfaces in three-dimensional space using rotations and translations. The depth information for the points of a region can then be generated automatically using the three-dimensional model of the region surface, simply by picking a view position and calculating the depth of each point as the distance from the view position to the point. Some embodiments may use other techniques for calculating depth from a three-dimensional model, such as using orthogonal projections instead of point projections, or using nonlinear scaling between distance and depth.

Figure 13:
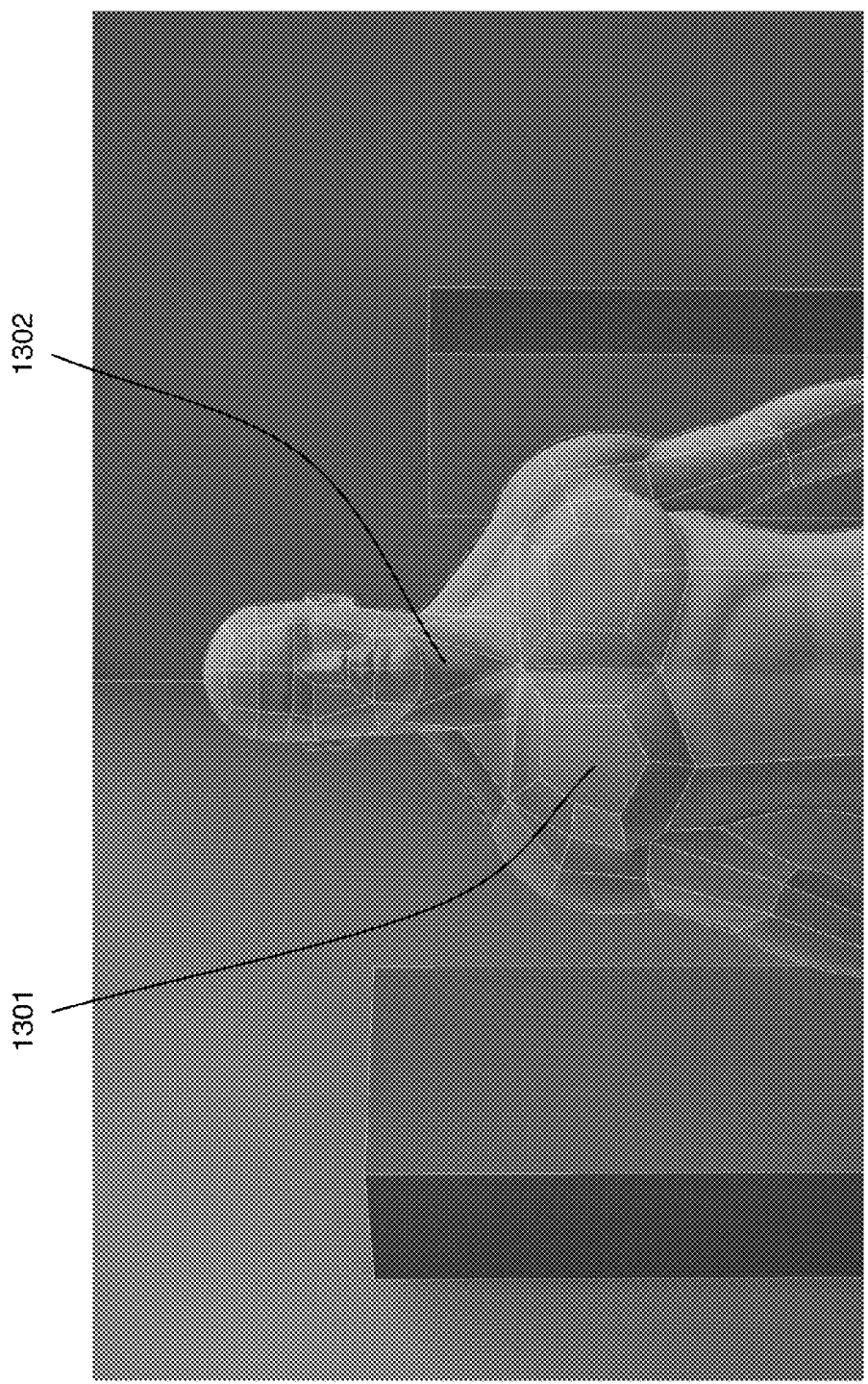
FIG. 13 illustrates an embodiment of a division of a 2D image of a human figure into regions, with each region assigned a distinct color for identification.
Figure 14:
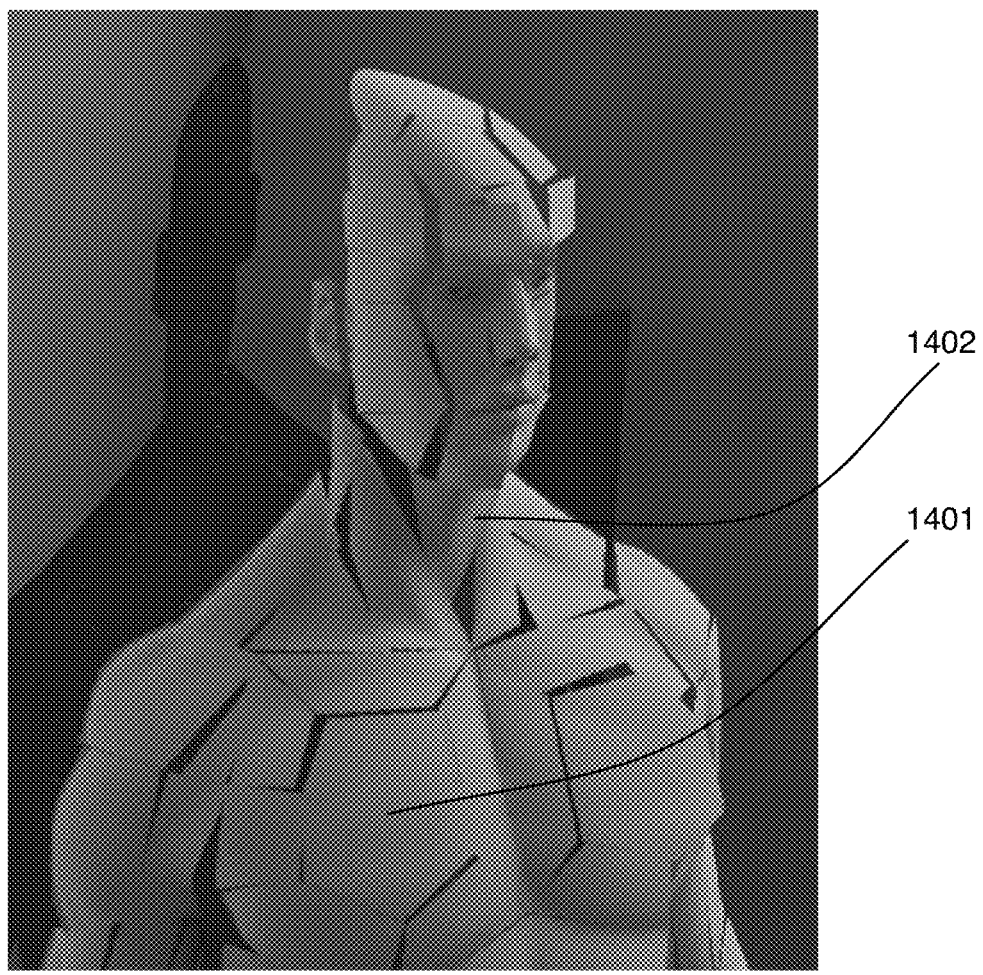
FIG. 14 illustrates an embodiment of positioning and orienting the regions of FIG. 13 in 3D space in order to generate depth information.
Figure 15:
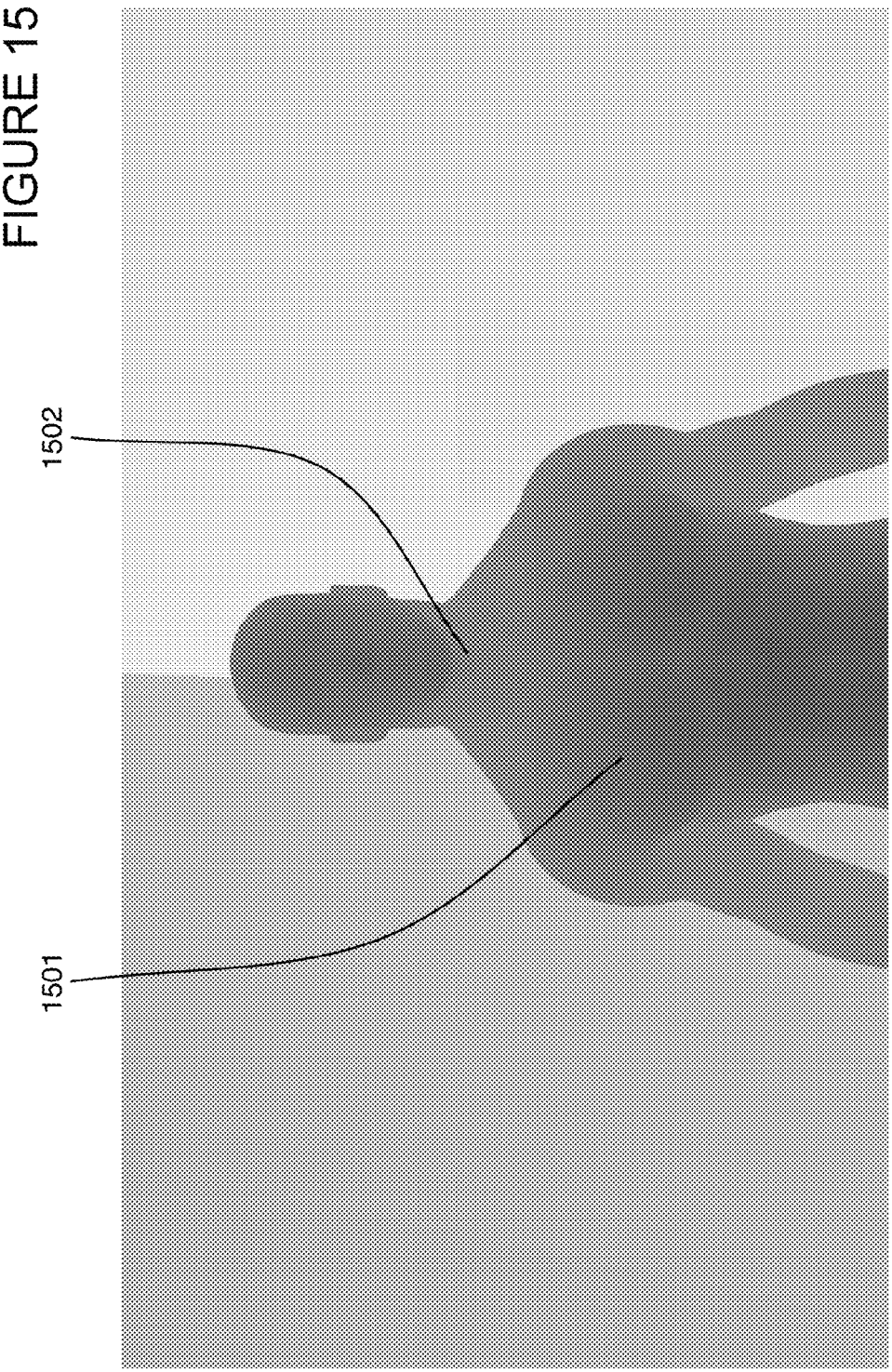
FIG. 15 illustrates an embodiment of a depth map generated from the 3D model of FIG. 14.

FIGS. 13 through 15 illustrate an embodiment of this procedure for positioning and orienting region surfaces or masks. Embodiments of the invention may utilize any and all methods and apparatus described in U.S. Patent Application entitled "EXTERNAL DEPTH MAP TRANSFORMATION METHOD FOR CONVERSION OF TWO-DIMENSIONAL IMAGES TO STEREOSCOPIC IMAGES", U.S. Ser. No. 13/874,625, filed 1 May 2013, the specification of which is hereby incorporated herein by reference. In FIG. 13 a 2D image of a human figure is divided into regions. Each region is assigned a distinct color for identification. Region 1301 is one side of the figure's chest; region 1302 is the front of the figure's neck. In FIG. 14 a surface corresponding to each region is positioned and oriented in 3D space. Surface 1401 in FIG. 14 corresponds to region 1301 in FIG. 13, and surface 1402 in FIG. 14 corresponds to region 1302 in FIG. 13. By obtaining depth information from a depth sensor, such as but not limited to radar or lidar for example, the regions 1301 and 1302 may be positioned using the generally noisy depth information as shown in FIG. 14. Surfaces may be flat, or they may be curved surfaces such as for example Bézier surfaces or NURBS surfaces. In some embodiments, each surface may be positioned or adjusted by an operator using 3D editing or compositing tools. In one or more embodiments software may assist in determining approximate positioning and orientation of each surface, or in applying constraints reflecting joints along surface boundaries. This enables the elimination of depth noise in the data to effectively smooth the regions shown in FIG. 14 to have edges that approximate the edges shown in FIG. 13 for example. Specifically, steps 109 or 111 or both in FIGS. 1, 1A and 1B, embodiments of the invention may obtain the generate regions and/or obtain depth information from an external system or sensor, for example separate from, coupled to or combined with a camera or cameras utilized to obtain the 2D images in step 101. The system may auto-generate masks for the regions within a certain tolerance or curve and calculate best fit for the planar or curved mask in step 109. For example, in some embodiments the surfaces of adjacent regions may be constrained to meet exactly or approximately in 3D space along their boundaries. In other embodiments these constraints may be relaxed to simulate spring-like forces between adjacent regions, and software may position regions to minimize the energy associated with these spring-like forces. Various combinations of manual positioning, automatic positioning, and application of hard or soft constraints may be used in different embodiments of the invention. FIG. 15 shows a depth map generated from the 3D positions and orientations of the surfaces in FIG. 14, for example through use of a function to eliminate noise and/or discontinuities in regions or masks, as performed by accepting user input or through use of smoothing algorithms or any combination thereof. Darker pixels indicate points closer to the viewer. Point 1501 in FIG. 15 has a darker shade than point 1502, reflecting the positioning of surface 1401 in FIG. 14 closer to the viewer than surface 1402.

Figure 16:
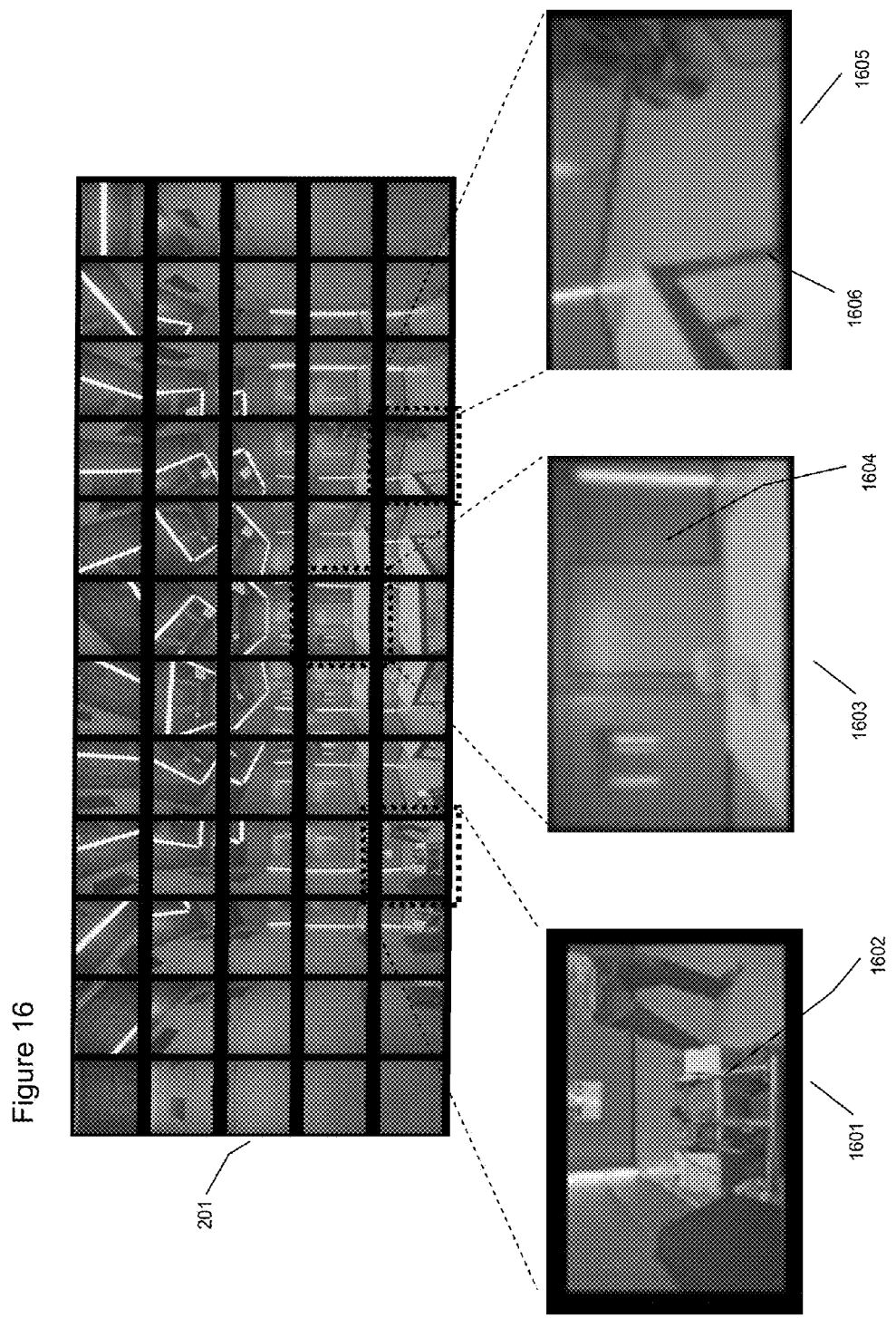
FIG. 16 illustrates the 2D images captured from a scene as shown in FIG. 2, highlighting features where modifications are desired to the images in order to form the 3D virtual reality environment.
Figure 17:
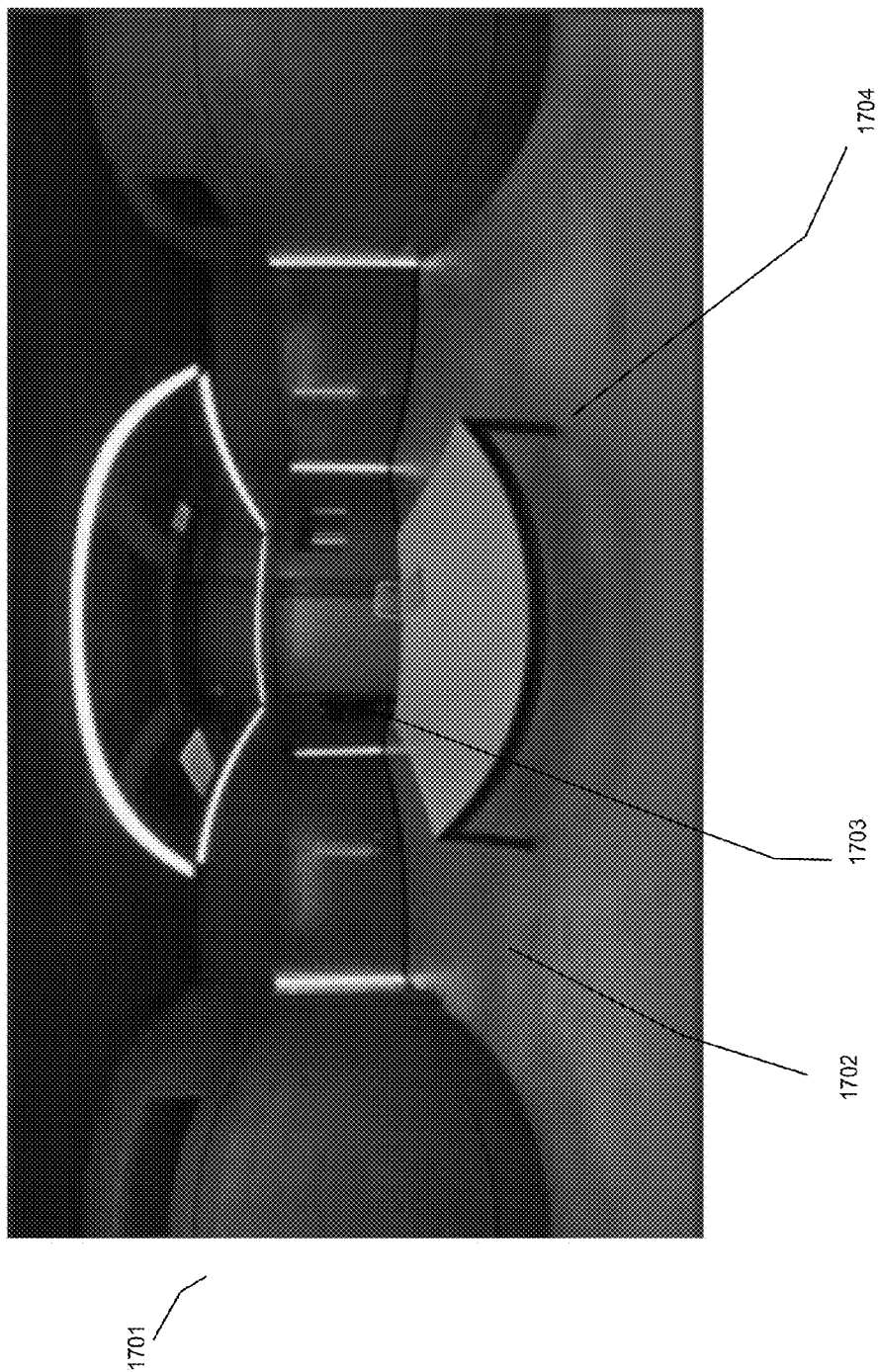
FIG. 17 illustrates an unwrapped image formed from the 2D images of FIG. 16 with the desired modifications made to the image.

In one or more embodiments of the invention, modifications may be made to the images captured from the scene in order to create a modified 3D virtual reality environment. Such modifications may include additions, deletions, modifications, or any combinations of these changes to the images. Modifications may be made in some embodiments to the original captured 2D images, to the stitched integrated images, to the spherical projection, to the unwrapped plane image, to the depth information, to the stereo images, or to any combinations of these. FIGS. 16 and 17 illustrate an embodiment with modifications made to the unwrapped plane image. FIG. 16 shows an example of a series of 2D images 201 captured from a scene, as is illustrated also in FIG. 2. In this illustrative example, it is desired to make modifications to images 1601, 1603, and 1605. Image 1601 contains equipment 1602 that was put in place to capture the images of the scene, as well as an image of an operator who was capturing the scene; it is desired to remove these items from the virtual reality environment. Image 1603 shows wall 1604 behind the desk; it is desired to add an image of a person in front of this wall in the virtual reality environment. Image 1605 shows a portion of the legs 1606 of the desk, but the 2D images did not capture the entire image of the legs; it is desired to extend these legs to form the complete desk in the virtual reality environment.

Image 17 illustrates an unwrapped image 1701 formed from the images of FIG. 16, with the desired modifications made to the unwrapped image. Equipment 1602 is removed from 1701 at location 1702. Human FIG. 1703 is inserted into empty area 1604. The table legs 1606 are extended to form complete table legs 1704. These modifications may be made using tools and techniques commonly utilized in the art for photo and image compositing. Objects that are inserted or extended require modifications to the unwrapped image, or elsewhere in the processing chain, as well as depth information. In some embodiments the composite image and depth information may be generated in multiple layers, so that multiple objects may exist along a radius from the center of the viewing sphere, but at different depth locations. With multi-layered depth information, a viewer in the virtual reality environment may see certain objects exposed as he changes his view position. This technique provides for automatic gap-filling as pixels in the stereographic images are shifted to provide the 3D view.

Figure 18:
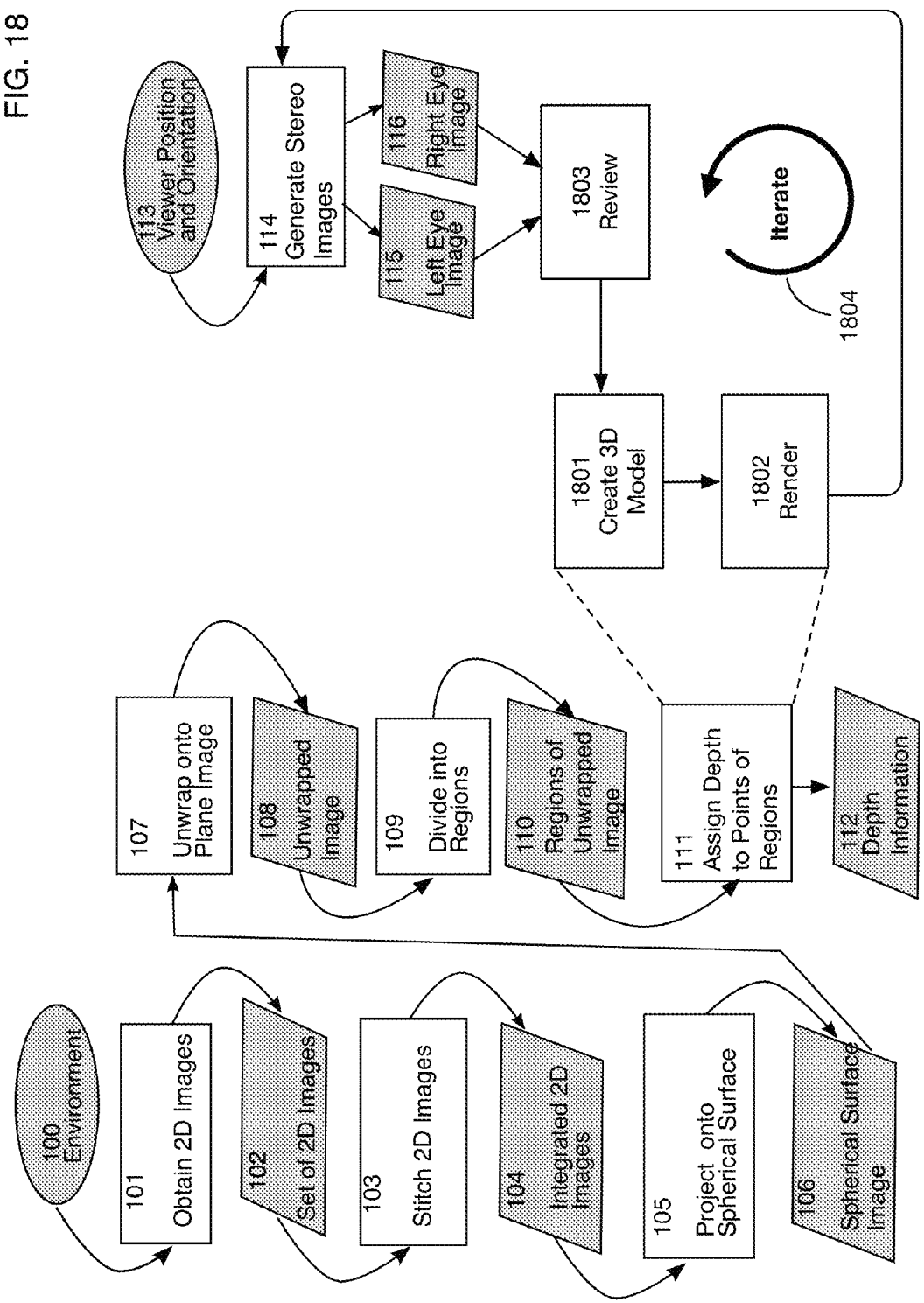
FIG. 18 illustrates an extension of flowchart of FIG. 1, which shows an iterative cycle of reviewing images, updating a 3D model, and re-rendering a scene.

The process of creating a 3D virtual environment may be iterative. FIG. 18 illustrates a typical workflow for this iterative process. This workflow is a variant of the embodiment shown in FIG. 1. In FIG. 18, step 111a (Assign Depth Map to Points of Regions) may comprise two sub-steps: 1801 (Create 3D Model), and 1802 (Render). As previously discussed, creating the 3D model may for example involve mapping images or regions to planes or other surfaces and positioning these planes or surfaces in 3D space. Rendering may for example involve generating spherical or cylindrical projections from these planes and surfaces. After rendering, stereoscopic images 115 and 116 are generated in step 114, as discussed above. In many cases a review step 1803 may be necessary or desirable to ensure that the 3D model created in step 1801 is accurate and meets the requirements of the project. For example, mapping of images onto 3D surfaces may in some cases introduce artifacts that are not apparent until the stereoscopic images 115 and 116 are reviewed. In other cases the images may be free of artifacts, but the depth assigned to regions or objects may not match the desired structure or artistic effects for the virtual reality environment. Therefore, the review 1803 may in many cases lead to additional modifications 1801 to the 3D model. Normally these changes require an additional rendering step 1802, followed by another stereoscopic image generation step 114, and another review 1803. The process may iterate through several loops 1804 before the final 3D model of the virtual reality environment is complete. This iterative process may be time consuming, particularly since the modifications 1801 to the 3D model and the rendering process 1802 may be computationally intensive.

Figure 19:
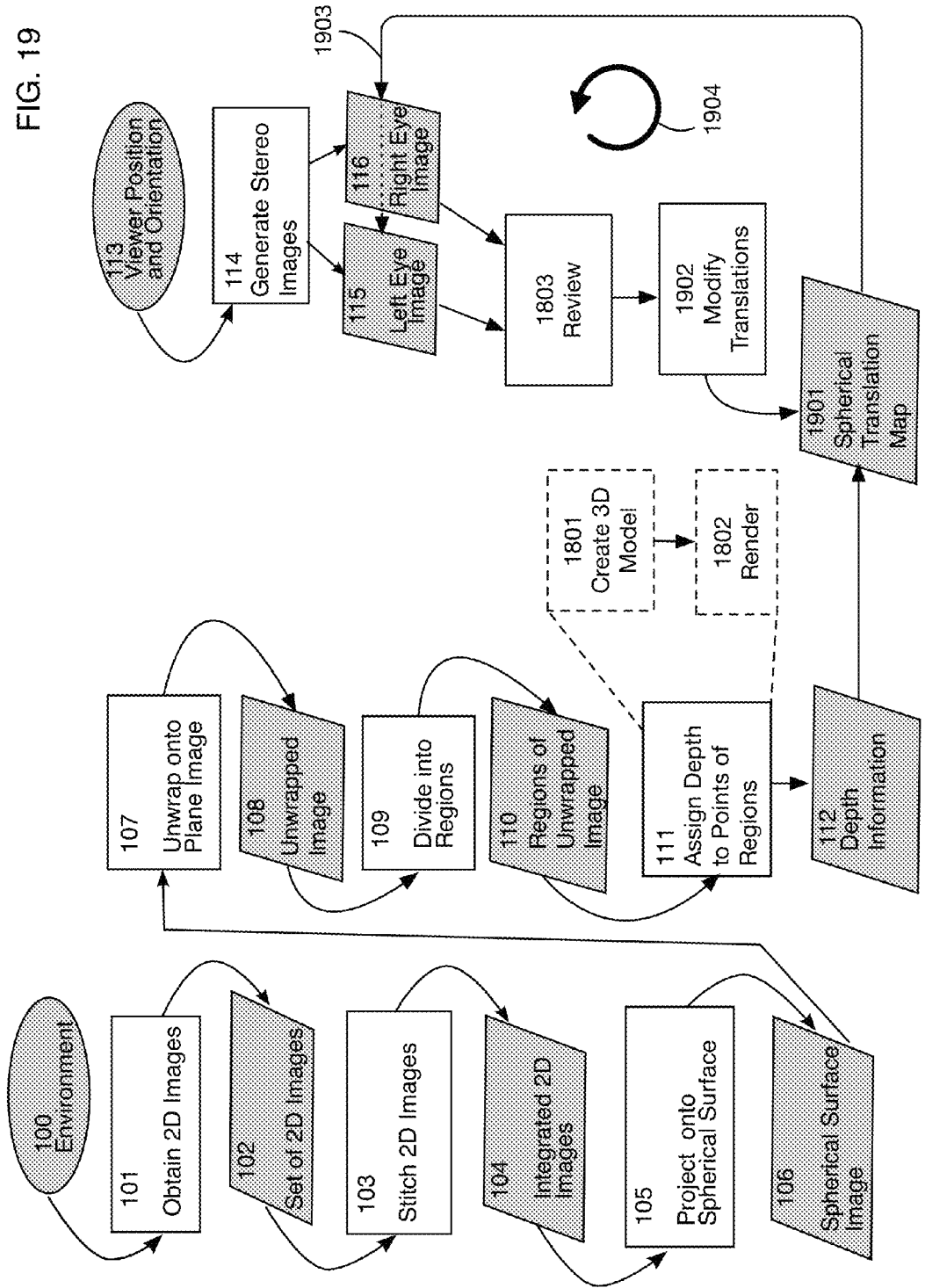
FIG. 19 illustrates an embodiment of the method that shortens the iterative review and update cycle shown in FIG. 18 using modifications to a spherical translation map that result in immediate changes to the stereo images.

FIG. 19 illustrates an embodiment of the method that shortens the iterative review/update/render process of FIG. 18. In this embodiment the depth information 112 is used directly for updates to the stereoscopic images 115 and 116. Steps 1801 and 1802 are used for the initial 3D model, and possibly for major modifications, but many or all modifications after the initial modeling may be made using the simpler and faster process described below. Depth information 112 is used to generate a spherical translation map 1901. This spherical translation map encodes information that determines the degree of horizontal pixel shifting between the left eye image 115 and the right eye image 116. One or more embodiments may use any desired format for the spherical translation map. A spherical translation map may be, for example, without limitation, a parallax map, a disparity map, a depth map, a U map, a UV map, or any combination of these maps. Any information that determines the amount of pixel translation between left and right images is in keeping with the spirit of the invention.

FIG. 19 illustrates a spherical translation map, since the 3D model is mapped to a sphere in one or more embodiments. One or more embodiments may use other geometries for the virtual environment, such as for example a cylinder or a cube; in these embodiments the spherical translation map would be modified for these geometries. For example, one or more embodiments may use a cylindrical translation map or a cubical translation map instead of or in addition to a spherical translation map.

As illustrated in FIG. 19, in this embodiment after review 1803, any required depth modifications may be performed in step 1902 (Modify Translations), which directly edits the spherical translation map 1901. The modified spherical translation map 1901 is then used directly at input 1903 to modify the left eye image 115 and the right eye image 116. This process may be iterated over multiple loops 1904. Because the steps 1801 and 1802 of creating the 3D model and rendering from this 3D model are not needed, the iterations 1904 may be very rapid and may be viewed in real-time by the editor or team performing the reviews and updates. This real-time review-update cycle may greatly improve the efficiency of the method for creating a 3D virtual environment.

For example, if the spherical translation map 1901 is a parallax map, which encodes the amount of horizontal pixel offset between left eye image 115 and right eye image 116, then modifications to this parallax map may be applied directly and rapidly to the images. Changes in offsets may be applied by shifting pixels in left and right images by the changes in the offsets. Re-rendering from the 3D model is not required. In some cases, modifying the shifts of pixels may generate gaps in the images with missing pixels. Techniques known in the art for gap-filling may be used to generate the missing pixels.

Figure 20:
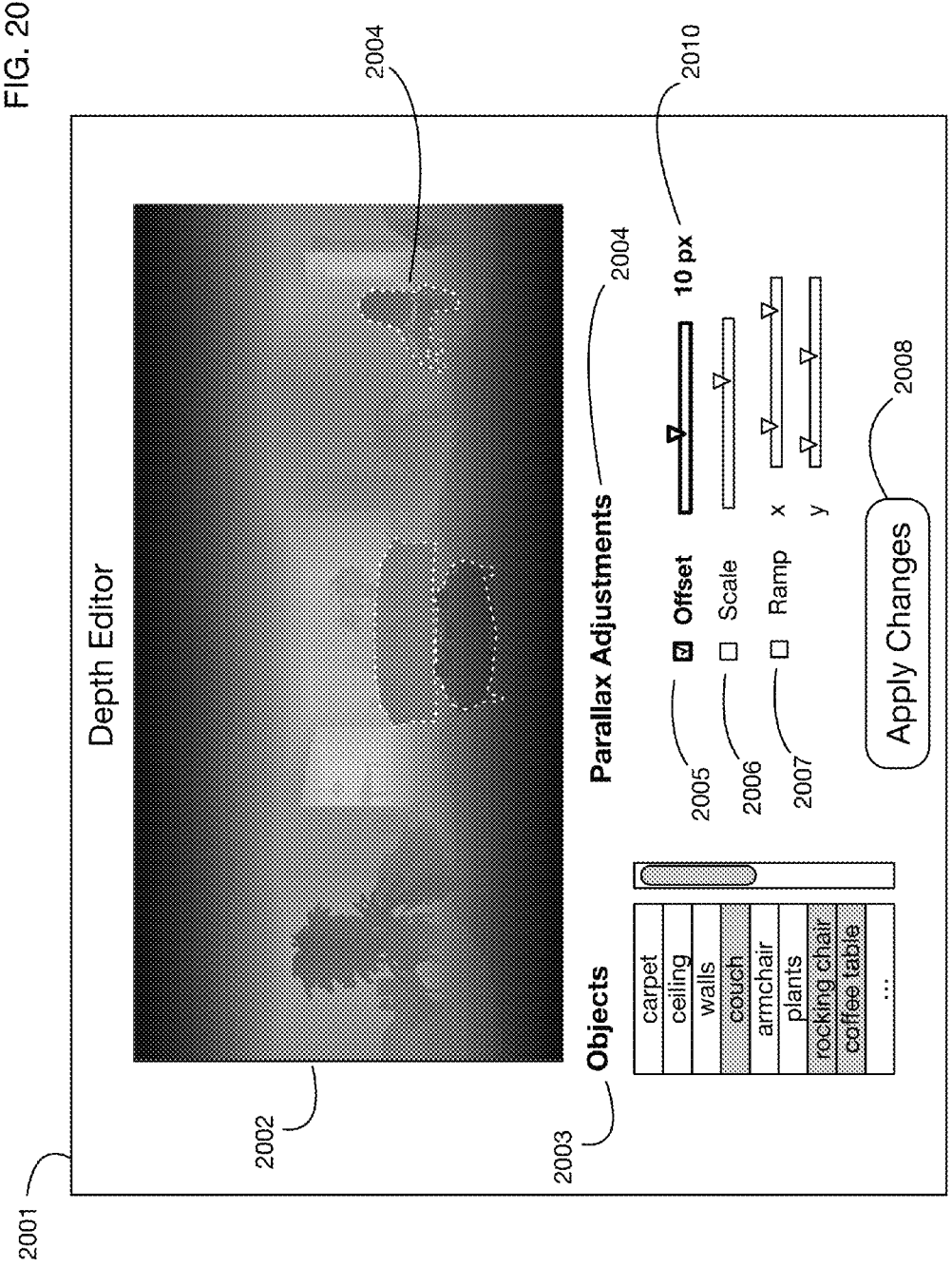
FIG. 20 illustrates a graphical user interface for an embodiment of the method, which provides controls for an editor to modify the translations of selected objects in a virtual reality scene.

One or more embodiments may use a graphical user interface to perform any of the steps of the method, including for example the step 1902 of modifying the spherical translation map. FIG. 20 shows an illustrative graphical user interface screen 2001 that may be used by one or more embodiments. In this interface, a spherical translation map 2002 is shown with the grayscale of each pixel corresponding to to the amount of translation between left and right images at that pixel location. One or more embodiments may use any spherical translation map that can be used to determine the amount of pixel shifting between left and right images. The translation map 2002 shown in FIG. 20 is the depth map shown in FIG. 8 of the virtual environment shown in FIGS. 6 and 7 and discussed above. This use of a depth map is illustrative; other embodiments of the user interface 2001 may for example use a spherical parallax map or a spherical displacement map. (In general the amount of pixel shifting between left and right images is inversely proportional to depth, as is known in the art.)

User interface screen 2001 includes a list of objects 2003. These objects may for example have been defined during the segmenting of the original stitched image into regions. One or more embodiments may use any desired method to create and modify masks that define objects. The objects 2003 are selectable, with the objects highlighted in gray currently selected. In the illustrative interface a selection boundary is shown in the translation map 2002 for each selected object; for example the boundary 2004 shows the selected rocking chair object.

Figure 21:
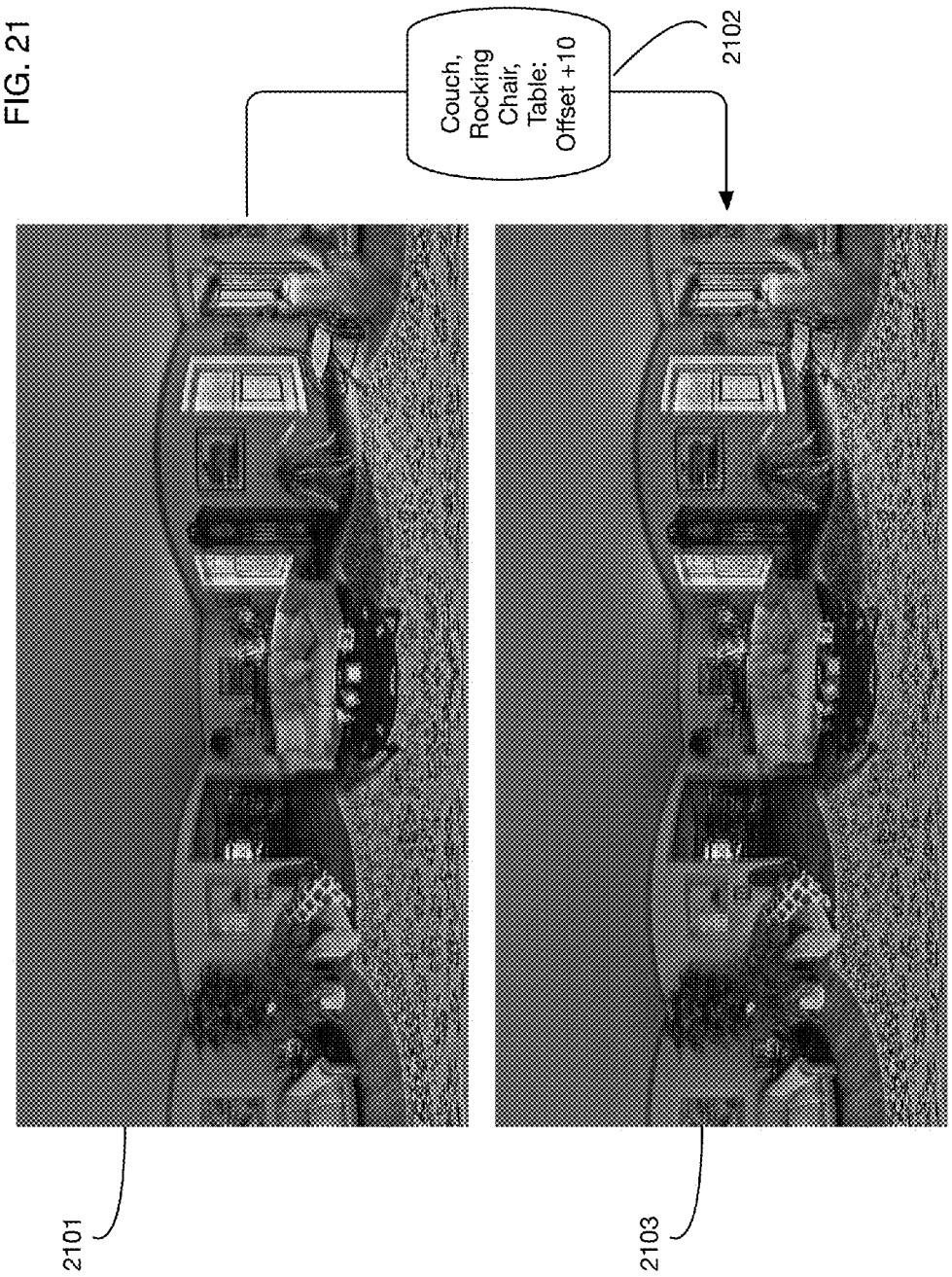
FIG. 21 shows an illustrative panoramic image in anaglyph stereo format; the top image is modified by the edits specified in FIG. 20, resulting in the bottom image.

The user interface provides one or more controls to edit the pixel translations of the selected objects. The illustrative user interface 2001 in FIG. 20 provides three controls: an offset control 2005 that adds or subtracts a fixed number of pixels to the translations for the selected objects; a scaling control 2006 that multiplies the pixel translations by a scaling factor; and a ramp control that applies a gradient to the pixel translations in the x and y directions. These controls are illustrative; one or more embodiments may use any controls and any user interface to support any type of modifications to the spherical translation map. The Apply Changes button 2008 applies the pixel translation modifications to the selected objects and regenerates the left and right images accordingly. In FIG. 20, the offset control 2005 is selected and the offset value 2010 is set to 10 pixels. FIG. 21 shows the effect of this modification. The images in FIG. 21 are anaglyph images with left and right images overlaid using different color filters. The top image 2101 shows a panoramic image prior to the modifications from FIG. 20. The bottom image 2103 shows the panoramic image after applying pixel translation modifications 2102. The couch, rocking chair, and table appear to be pulled further forward in the scene because the left and right pixel shifts for these objects have been increased.

Figure 22:
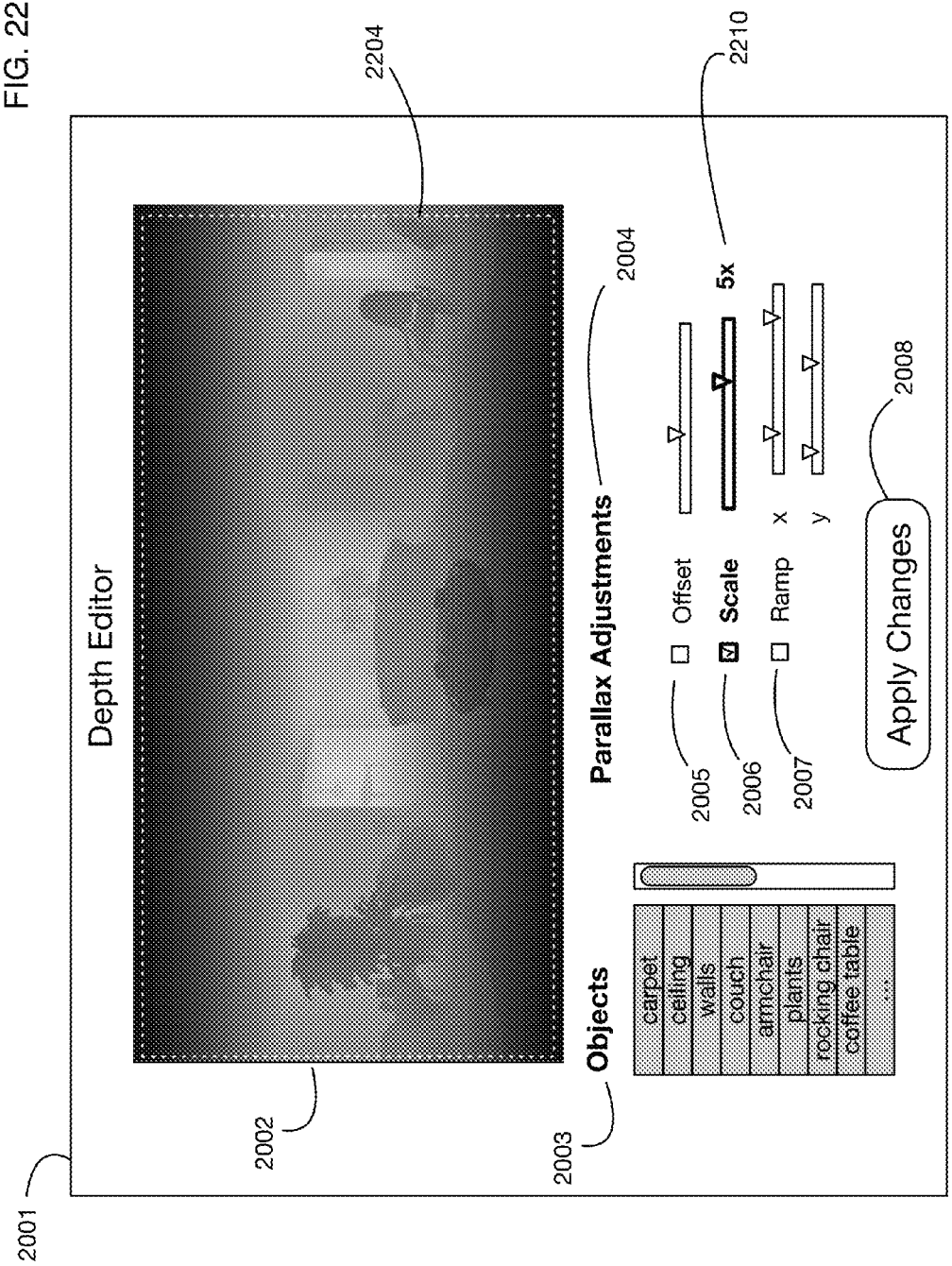
FIG. 22 shows a different edit for the translations of objects in the graphical user interface shown in FIG. 20.
Figure 23:
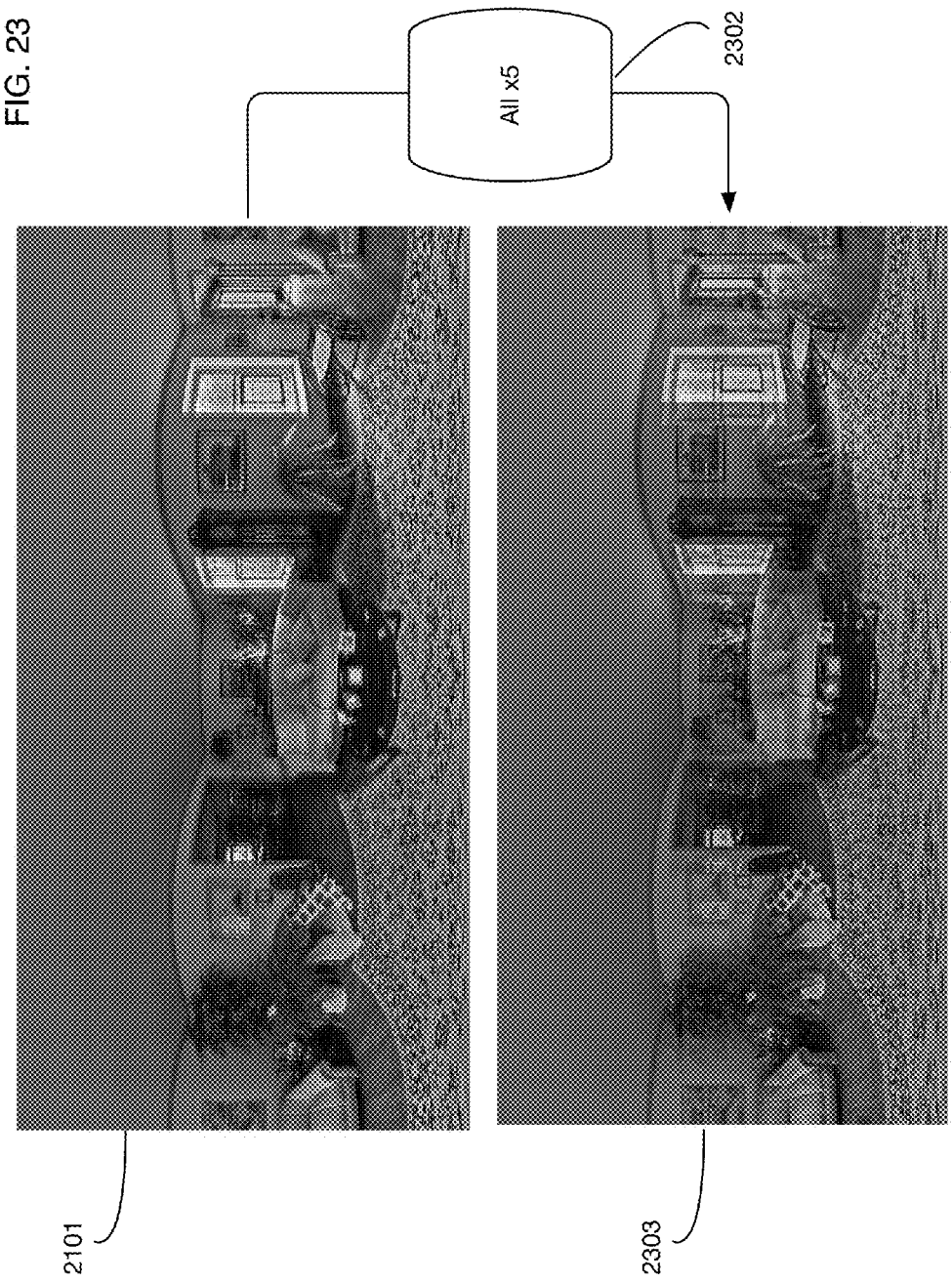
FIG. 23 shows another illustrative panoramic image in anaglyph stereo format; the top image is modified by the edits specified in FIG. 22, resulting in the bottom image.

FIG. 22 shows the same graphical user interface screen 2001 as FIG. 20, but scale control 2006 is selected instead of offset control 2005. All objects are selected in list 2003, as shown with boundary 2204 around the entire spherical translation map. The scaling value 2210 is set to 5×, indicating that the pixel translation values of the entire scene should be multiplied by 5. The result of this modification is shown in FIG. 23. The top image 2101 as before shows an anaglyph stereoscopic image of the scene prior to the modifications. After modifications 2302, the image 2303 shows that all objects in the scene appear closer to the viewer.

Figure 24:
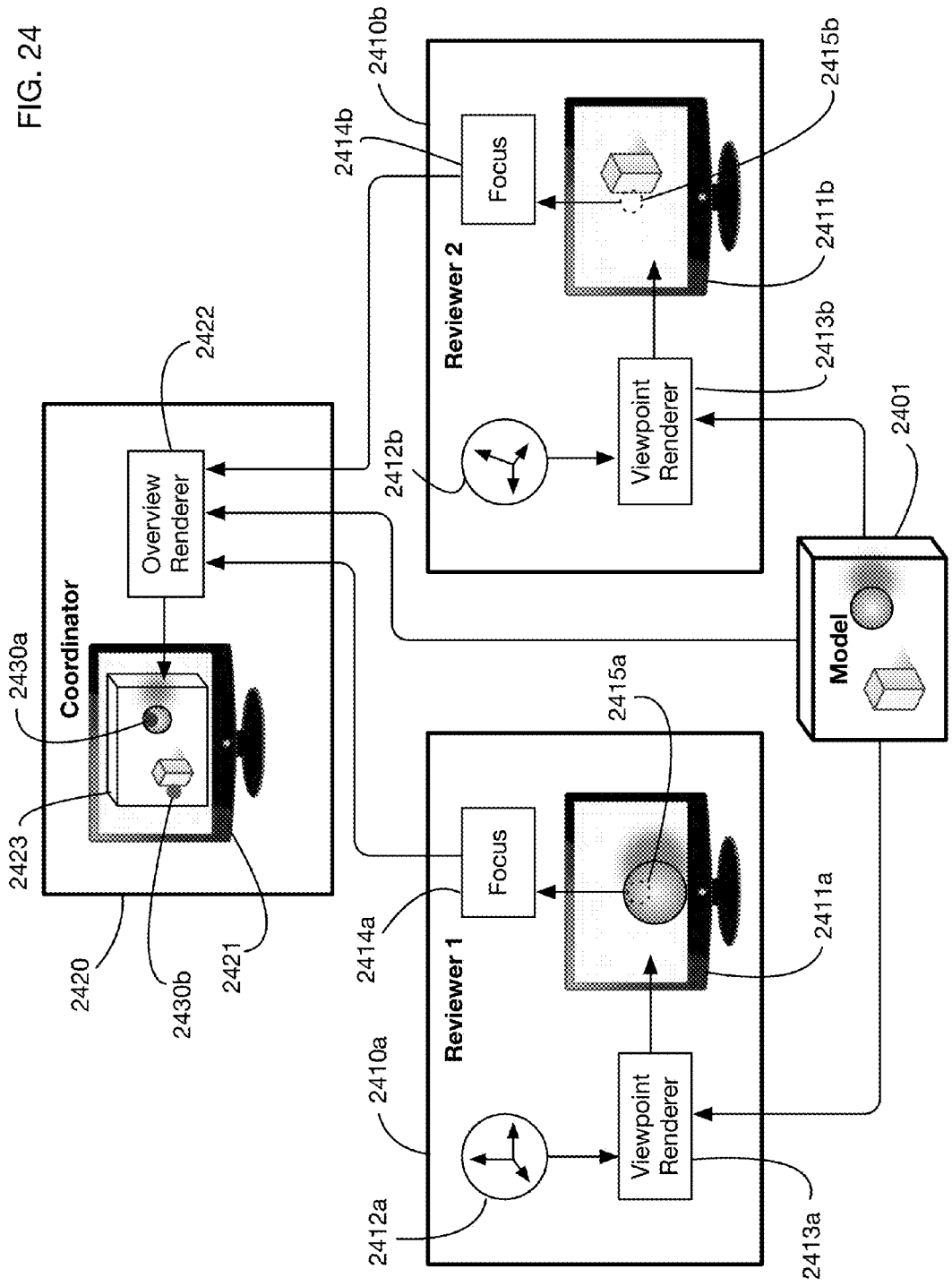
FIG. 24 shows an architectural overview of an embodiment of a system that enables multiple reviewers to review a 3D model simultaneously from different viewpoints, with the reviews coordinated by a coordinator.

3D models, in particular virtual reality environments, may be viewed from different viewpoints. One or more embodiments enable a review process for validating or correcting a 3D model that uses multiple reviewers operating simultaneously to review the model from different viewpoints. FIG. 24 illustrates a block diagram showing components of an embodiment of a multi-reviewer system for reviewing 3D model 2401. This model may be for example a virtual reality environment created from real images, from computer generated elements, or from a mixture of real images and computer generated elements. The model may be either static or dynamic. The 3D model may also be a 3D movie in one or more embodiments.

The illustrative example in FIG. 24 shows two reviewers, Reviewer 1 and Reviewer 2, and a single Coordinator coordinating the review process. These numbers are illustrative; embodiments of the system may support any desired number of reviewers and coordinators operating in parallel or sequentially. Reviewer 1 operates review station 2410a; reviewer 2 operates review station 2410b, and the Coordinator operates coordinator station 2420. Each review and coordinator station has access to 3D model 2401. In one or more embodiments, the 3D model may be replicated onto different stations; in other embodiments a central 3D model may be used and stations may access this central model over a network for example. Review stations may allow reviewers to observe the 3D model from various viewpoints. Therefore a review station may include a device or subsystem to measure or to obtain input for the pose of the reviewer, in order to determine the desired viewpoint of the 3D model. The pose of a reviewer may include for example the reviewer's orientation or position or both. For example, a review station may include a virtual reality headset that measures the orientation of the user's head or of the user's eyes; these measurements may be used as the pose of the reviewer. One or more embodiments may use any device or sensor to measure any aspect of the pose of a reviewer. Alternatively or in addition, one or more embodiments may provide input devices or user interface controls that allow a reviewer to select a pose manually. For example, a reviewer may use a joystick or mouse or other input device to move a viewpoint around a 3D model. In FIG. 24 review station 2410a has reviewer pose subsystem 2412a, and review station 2410b has reviewer pose subsystem 2412b. These reviewer pose subsystems may be any sensor or sensors, or any input device or input devices, or any user interface controls, that measure the pose of a reviewer or that accept input to control the viewpoint from which the 3D model is viewed.

Review stations may generate one or more display images showing the 3D model from the viewpoint determined by the reviewer pose subsystem. Generating these images is the function of a viewpoint renderer. Using techniques known in the art, and techniques described above in this specification, viewpoint renderers may generate monoscopic or stereoscopic views of the 3D model from the viewpoint corresponding to the reviewer's pose. These views may be displayed on any number of display devices for each reviewer. Display devices may for example include computer monitors, as well as virtual reality headsets or other head-mounted displays. In FIG. 24, viewpoint renderer 2413a in review station 2410a generates viewpoint images for display 2411a; viewpoint renderer 2413b in review station 2410b generates viewpoint images for display 2411b. In one or more embodiments viewpoint renderers may be remote from the physical hardware of a review station, and viewpoint images may be sent for example over a network connection to the displays of the review station. In one or more embodiments viewpoint renderers may use any combination of hardware and software to render viewpoint images. In one or more embodiments multiple review stations may share viewpoint renders or components thereof.

In one or more embodiments, the information on the current viewpoint of one or more reviewers may be communicated to the coordinator station. This information assists the coordinator in coordinating the reviews. For example, a coordinator may be able to determine that all relevant viewpoints have been reviewed and checked. In addition, a coordinator may be able to communicate more effectively with a reviewer about the 3D model if the coordinator can observe the precise viewpoint from which the reviewer is viewing the 3D model.

More generally, in one or more embodiments each reviewer may have one or more focus regions within his or her viewpoint that define areas of interest to the reviewer. These focus regions may for example encompass the reviewer's entire field of view or they may be selected portions of the field of view. A review station may include a reviewer focus subsystem that determines the focus region or focus regions for each reviewer and communicates this information to the coordinator station. In FIG. 24, reviewer station 2410a has reviewer focus subsystem 2414a, and reviewer station 2410b has reviewer focus subsystem 2414b. A reviewer focus subsystem may include any combination of hardware and software components that determine the region or regions of focus for the reviewer. Embodiments may use various approaches to determine the reviewer's focus regions. In one or more embodiments, the focus region for a reviewer may be presumed to be for example at the center of the field of view of the reviewer. This example is illustrative; other embodiments may use different approaches to define focus regions, as described below. In FIG. 24, the current focus region for review station 2410a is the central region 2415a at the center of the reviewer's field of view; similarly, the current focus region for review station 2410b is the central region 2415b at the center of the reviewer's field of view. These focus regions are calculated by the respective reviewer focus subsystems and are communicated to the coordinator station 2420.

The coordinator station provides information that allows the coordinator to observe the entire review process from the collection of reviewers. In one or more embodiments, the coordinator station may generate one or more overview images of the 3D model that show the entire model. In these embodiments the coordinator may for example focus on the model as a whole, while each reviewer focuses on the view of the model from various specific viewpoints. As an example, an overview image may be a panoramic image of a complete spherical 3D model of a virtual reality environment. Any projection or image or collection of images may serve as overview images in one or more embodiments. The overview images may be generated by model overview renderer that has access to the 3D model. An overview renderer may use any techniques known in the art, and techniques described in this specification, to generate one or more overview images of the 3D model. Overview images may be monoscopic or stereoscopic. For virtual reality environments, overview images may be for example, without limitation, spherical projections, cylindrical projections, cubical projections, or any collection of planar projections. In FIG. 24, model overview renderer 2422 access 3D model 2401 and creates overview image 2423 on the coordinator display 2421. This illustrative example shows only a single coordinator display; one or more embodiments may use any number and type of coordinator displays.

One or more embodiments may augment the overview images shown in the coordinator station with information depicting or describing the reviewer focus regions. For example, graphics showing the location of each reviewer focus region may be overlaid onto an overview image of the 3D model. This is illustrated in FIG. 24, with graphic 2430a showing the location of Reviewer 1's focus region 2415a, and graphic 2430b showing the location of Reviewer 2's focus region 2415b. These graphic overlays show the coordinator which parts of the 3D model each reviewer is currently observing. In this example, color coding is used to differentiate between the focus region for each reviewer: Reviewer 1's focus region is shown in blue with graphic 2430a, and reviewer 2's focus region is shown in red with graphic 2430b. One or more embodiments may use any differentiating characteristic of graphics or text to identify the reviewer or reviewer station associated with each focus region. These characteristics may include for example, without limitation, color, size, shape, icon, pattern, texture, transparency, motion, or labeling. For example, in addition to or instead of using color coding, one or more embodiments may overlay the focus region with a label that shows the name of the reviewer or of the review station.

In the example illustrated in FIG. 24, the graphics associated with the reviewer focus regions are overlaid onto a 3D model overview image. In one or more embodiments these graphics may be shown only when and as requested by the coordinator. For example, in one or more embodiments a coordinator may have a selection list of reviewers, and may select one or more reviewers to enable display of the graphics associated with those users' focus regions. Any method of providing a coordinator with information that shows the focus regions of the reviewers is in keeping with the spirit of the invention.

Embodiments may define focus regions in any desired manner depending on the application for the multi-reviewer system. FIG. 25 illustrates an embodiment that displays the reviewers' entire fields of view as the focus regions. Images 2411*c*, 2411*d*, and 2411*e* correspond to reviewer station displays, and image 2421*a* corresponds to a coordinator station display. In this illustrative embodiment, a spherical lat-long projection of a 3D scene is used as overview image 2421*a*. The reviewer viewpoint images 2411*c*, 2411*d*, and 2411*e* are planar projections from selected viewpoints. In this embodiment, the entire field of view of each reviewer is displayed on the overview image 2421*a* as a dashed, color-coded outline. The overview image also includes legend 2520 showing the color assigned to each reviewer. In this example, reviewer Mo is looking left of center and boundary 2511*c* shows his field of view; reviewer Larry is looking right of center and is zoomed in on the window and picture, and boundary 2511*d* shows his field of view; and reviewer Curly is looking straight down, and boundary 2511*e* shows his field of view. The lat-long projection of the overview image 2421*a* distorts the rectangular boundaries of the reviewer fields of view into curved boundaries.

FIG. 26 illustrates a variation of the embodiment of FIG. 26 that uses central dots 2611*c*, 2611*d*, and 2611*e* instead of boundaries around the entire fields of view. Each dot corresponds to the central region of the corresponding reviewer's field of view. Dots are color-coded as before, and in addition in this example are partially transparent so that the coordinator can observe objects through the dots. One or more embodiments may use any type of graphics to show any desired portion of a reviewer's field of view. For example, one or more embodiments may use different shapes instead of or in addition to different colors to differential between reviewers. The size of the dots may be adjusted either by the system or by the coordinator. One or more embodiments may combine the graphics of FIG. 25 and FIG. 26, to show for example the entire field of view with a boundary and the center of the field of view with a dot or other graphic. One or more embodiments may show gridlines on the field of view for one or more reviewers.

In one or more embodiments, reviewers may be able to designate specific areas within their field of view as focus regions. This capability may be useful for example if a reviewer wants to highlight a particular object to bring it to the attention of the coordinator. For example, a reviewer may notice that the 3D model has an anomaly or an inaccuracy at a particular location or a particular object. By highlighting this object or region the reviewer can notify the coordinator or other parties that this area requires attention. FIG. 27 illustrates an embodiment with this capability. Reviewer Larry, now viewing image 2411*f*, highlights the fern with selection box 2701. This creates an additional reviewer focus region that is communicated to the coordinator station. In addition to the dots showing the central region of each reviewer's field of view (as in FIG. 26), the coordinator display 2421*a* also shows the corresponding highlighted fern with boundary 2702. This boundary is color-coded to show which reviewer made the selection. In one or more embodiments reviewers may select any number of regions or objects and the system may communicate these as focus regions to the coordinator. In one or more embodiments a reviewer may annotate selected regions or objects with notes, including possibly audio notes, and these notes may be communicated to the coordinator. In one or more embodiments annotations from reviewers may be displayed on the coordinator overview images.

Figure 28:
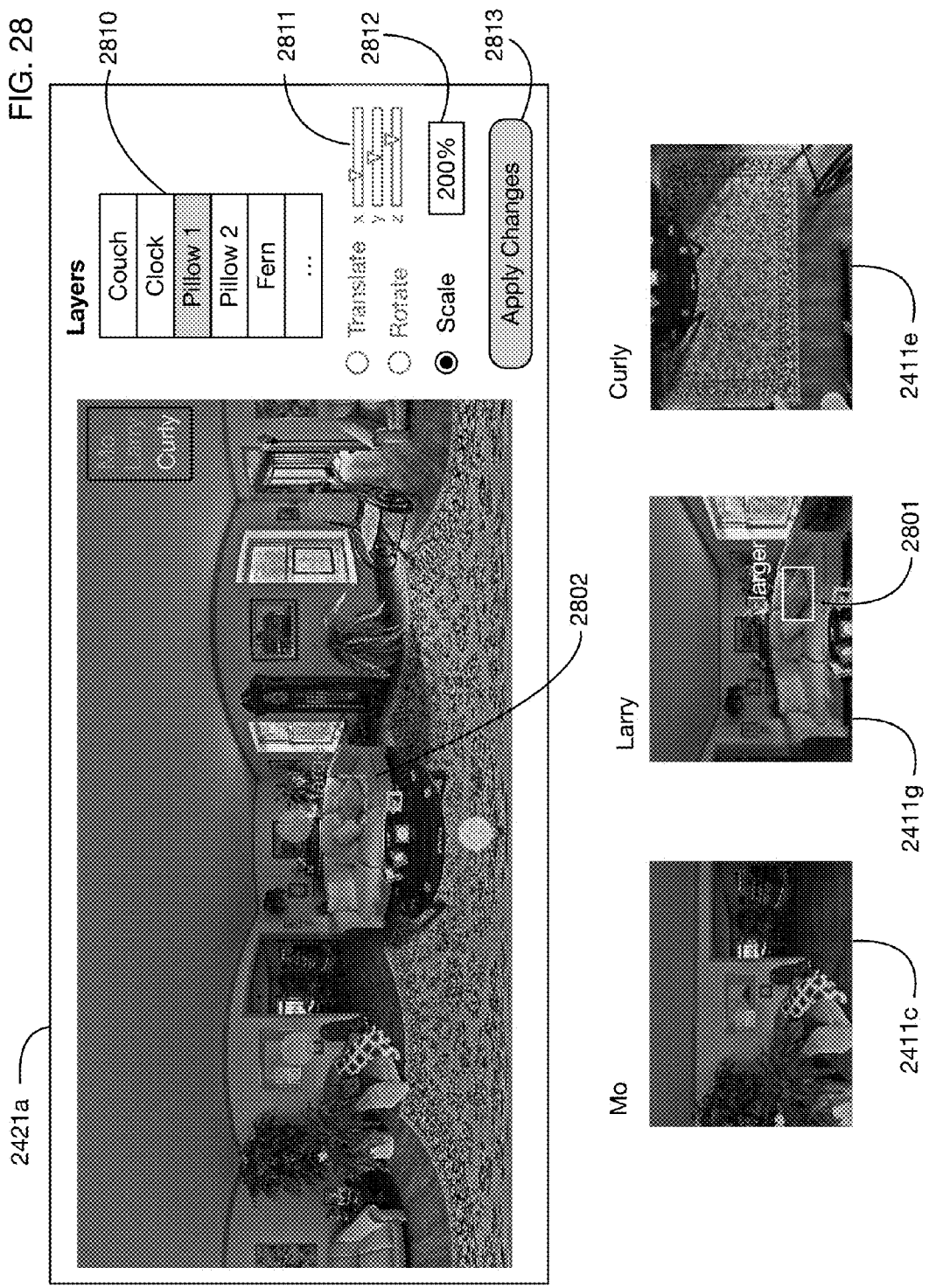
FIG. 28 illustrates an embodiment of a multi-reviewer system that includes a capability for the coordinator to modify the 3D model; in this example the coordinator increases the size of a selected object.

In one or more embodiments the coordinator, or the reviewers, or other editors, may be able to modify the 3D model during the review process. In one or more embodiments some or all modifications may be performed after the review process, and the review process may be used to collect notes on changes that should be made or considered. FIG. 28 illustrates an embodiment that includes a model update capability in the coordinator station. In this illustrative example, reviewer Larry has highlighted a pillow on the couch with the annotation that it should be made larger. The selection and annotation 2801 appear on the reviewer display 2411*g*. A corresponding color-coded selection and annotation 2802 appear on the coordinator display 2421*a*. Reviewers may note any desired changes to a 3D model, including for example changes in object position, depth, size, color, orientation, texture, shadows, lighting, motion. Reviewers may also note any observed artifacts that may for example arise during model creation.

In the embodiment shown in FIG. 28, the coordinator station has illustrative model update capabilities. The model layers are shown in list 2810, and the coordinator may select a layer to modify. Modifications may include translations and rotations 2811, and scaling changes 2812. These model update features are illustrative; embodiments may use any 3D modeling or editing techniques to provide coordinators or reviewers with the ability to make any desired changes to the 3D model. In this example the coordinator selects the layer containing the pillow, chooses a scale update, and doubles the size 2812 of the pillow. When the coordinator presses the Apply Changes button 2813, the modifications are made to the 3D model and are reflected in the coordinator and reviewer displays.

Figure 29:
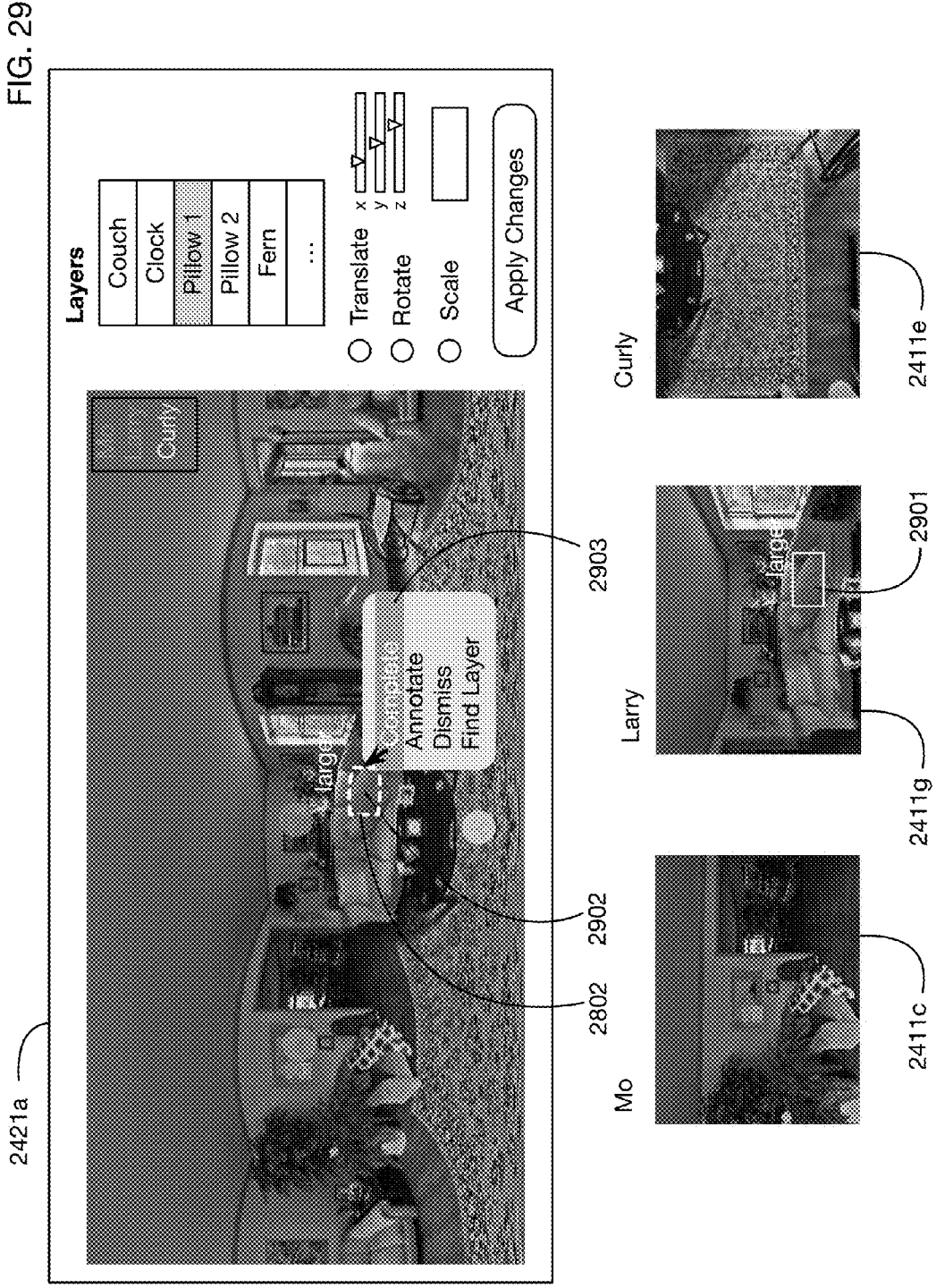
FIG. 29 illustrates the embodiment of FIG. 28 after the object's size has been increased; it also illustrates actions a coordinator may take to process the highlighted region selected by a reviewer.

FIG. 29 continues the example shown in FIG. 28 and shows an illustrative display after the model update is made. The size of the pillow is increased as shown in 2901 in the reviewer display 2411*g* and in 2902 in the coordinator display 2421*a*. In one or more embodiments the coordinator station may include a capability to remove or otherwise process a reviewer focus region (along with possible annotations). For example, a coordinator may remove a region selected by a reviewer once a model update or correction for that region has been completed or scheduled. In the illustrative user interface of FIG. 29, the coordinator can right-click on the graphic 2802 showing the selected region, which brings up a pop-up menu 2903. This pop-up menu shows options for processing the focus region. The coordinator selects "Complete" to indicate that the model update corresponding to this region has been completed. Other illustrative options are shown, including Annotate to add further annotation, Dismiss to ignore the region without making an update, and Find Layer to locate the layer or layers within the boundary. These options and the user interface illustrated in FIG. 29 are illustrative; embodiments may use any user interface to provide coordinators or reviewers with capabilities to update models and process reviewer focus regions in any desired manner.

FIG. 30 continues the example shown in FIG. 29 and shows an illustrative display after the coordinator clicks the Complete option for the focus region. The selection boxes and annotations for the pillow in the reviewer display 2411*g* and the coordinator display 2421*a* are removed. The larger pillow in the 3D model after the update is shown in the reviewer display at 2901 and in the coordinator display at 2902.

While the invention herein disclosed has been described by means of specific embodiments and applications thereof, numerous modifications and variations could be made thereto by those skilled in the art without departing from the scope of the invention set forth in the claims.

What is claimed is:

1. A 3D model multi-reviewer system comprising
a 3D model of an environment;
a plurality of review stations, each operated by a reviewer from a plurality of reviewers, each coupled to said 3D model, each comprising
at least one review display;
a reviewer pose subsystem configured to measure or obtain a pose of said reviewer relative to said 3D model;
a viewpoint renderer configured to
receive said pose of said reviewer from said reviewer pose subsystem;
generate at least one image of said 3D model from a viewpoint corresponding to said pose of said reviewer;
display said at least one image on said at least one review display;
a reviewer focus subsystem configured to
calculate or obtain one or more reviewer focus regions within said 3D model, each corresponding to a portion of said 3D model viewed by said reviewer;
a coordinator station operated by a coordinator and coupled to said plurality of review stations and to said 3D model, comprising
at least one coordinator display;
a model overview renderer configured to
generate at least one overview image of said 3D model;
receive said one or more reviewer focus regions from at least one of said plurality of review stations;
add a graphical indicator to said at least one overview image for each of said one or more reviewer focus regions received from said at least one of said plurality of review stations;
display said at least one overview image on said at least one coordinator display.

2. The system of claim 1 wherein a location in said at least one overview image of said graphical indicator corresponds to a location in said 3D model of the reviewer focus region associated with said graphical indicator.

3. The system of claim 1 wherein said graphical indicator includes a differentiating characteristic identifying the reviewer or the review station associated with the graphical indicator.

4. The system of claim 3 wherein said differentiating characteristic comprises one or more of a color, a shape, a pattern, an icon, and a label.

5. The system of claim 1 wherein said one or more reviewer focus regions for each of said plurality of review stations comprise all or a portion of a field of view of the corresponding reviewer.

6. The system of claim 5 wherein said portion of said field of view comprises a center portion of said field of view of said reviewer.

7. The system of claim 6 wherein center portion of said field of view comprises a center point of said field of view of said reviewer.

8. The system of claim 1 wherein said reviewer focus subsystem is further configured to accept a focus input from said reviewer that defines or modifies said one or more reviewer focus regions.

9. The system of claim 1 wherein said coordinator station further comprises
a model update subsystem configured to
accept a 3D model update from said coordinator;
modify said 3D model based on said 3D model update, or record said 3D model update in a list of updates to be applied.

10. The system of claim 1 wherein said coordinator station is further configured to accept a selection of a reviewer focus region from said coordinator;
remove said graphical indicator associated with said reviewer focus region from said at least one overview image.

11. The system of claim 1 further comprising a 3D model generation subsystem configured to obtain a plurality of 2D images of a virtual reality environment from at least one camera;
stitch together said plurality of 2D images into one or more integrated 2D images of said virtual reality environment;
project said one or more integrated 2D images onto a spherical surface, yielding a spherical surface image;
unwrap said spherical surface image onto an unwrapped plane image;
divide said unwrapped plane image into a plurality of regions;
assign depth information to the points of each of said plurality of regions to create said 3D model.

12. The system of claim 9 wherein
said at least one review display comprises one or more stereoscopic 3D displays;
said viewpoint renderer is further configured to
render a left viewpoint image of said 3D model from said pose of said reviewer;
render a right viewpoint image of said 3D model from said pose of said reviewer;
said model update subsystem is further configured to
generate a spherical translation map from said 3D model, wherein
said spherical translation map assigns translation values to points on a spherical surface in said 3D model with a user located at a center of said spherical surface;
each of said translation values is a function of a distance of a closest object in said 3D model from said user along a ray between said user and each of said points on said spherical surface;
apply one or more translation modifications to said spherical translation map to adjust a depth of one or more objects in said three-dimensional model relative to said user;
said viewpoint renderer is further configured to
modify said left viewpoint image and said right viewpoint image to reflect said translation modifications without re-rendering said left viewpoint image and said right viewpoint image from said 3D model.

13. The method of claim 12 wherein said spherical translation map is a parallax map that comprises horizontal pixel offset values between a left and right stereoscopic pair of images.

14. The system of claim 12 wherein said spherical translation map is a depth map.

15. The system of claim 12 wherein said spherical translation map is a U map or a UV map.

16. The system of claim 1 wherein
said at least one coordinator display comprises one or more stereoscopic 3D displays;
said overview renderer is further configured to
generate a left viewpoint panoramic image of said 3D model;
generate a right viewpoint panoramic image of said 3D model.

17. The system of claim 16 wherein said left viewpoint panoramic image and said right viewpoint panoramic image each comprise a 360 degree horizontal field of view.

18. The system of claim 17 wherein said left viewpoint panoramic image and said right viewpoint panoramic image each comprise a 180 degree vertical field of view.

19. A 3D model multi-reviewer system comprising
a 3D model of an environment;
a plurality of review stations, each operated by a reviewer from a plurality of reviewers, each coupled to said 3D model, each comprising
   at least one review display;
   a reviewer pose subsystem configured to measure or obtain a pose of said reviewer relative to said 3D model;
   a viewpoint renderer configured to
      receive said pose of said reviewer from said reviewer pose subsystem;
      generate at least one image of said 3D model from a viewpoint corresponding to said pose of said reviewer;
      display said at least one image on said at least one review display;
   a reviewer focus subsystem configured to
      calculate or obtain one or more reviewer focus regions within said 3D model, each corresponding to a portion of said 3D model viewed by said reviewer;
      wherein said one or more reviewer focus regions comprise all or a portion of a field of view of the said reviewer;
a coordinator station operated by a coordinator and coupled to said plurality of review stations and to said 3D model, comprising
   at least one coordinator display;
   a model overview renderer configured to
      generate at least one overview image of said 3D model;
      receive said one or more reviewer focus regions from at least one of said plurality of review stations;
      add a graphical indicator to said at least one overview image for each of said one or more reviewer focus regions received from said at least one of said plurality of review stations;
      display said at least one overview image on said at least one coordinator display;
   a model update subsystem configured to
      accept a 3D model update from said coordinator;
      modify said 3D model based on said 3D model update, or record said 3D model update in a list of updates to be applied;
wherein
   a location in said at least one overview image of said graphical indicator corresponds to a location in said 3D model of the reviewer focus region associated with said graphical indicator;
   said graphical indicator includes a differentiating characteristic identifying the reviewer or the review station associated with the graphical indicator;
   said differentiating characteristic comprises one or more of a color, a shape, a pattern, an icon, and a label.

* * * * *